United States Patent [19]

Inuzuka et al.

[11] Patent Number: 4,477,179

[45] Date of Patent: Oct. 16, 1984

[54] IMAGE FORMING APPARATUS WITH ADJUSTABLE LIGHT SOURCE

[75] Inventors: Tsuneki Inuzuka, Machida; Masato Ishida; Yoshihiro Kawatsura, both of Kawasaki, all of Japan

[73] Assignee: Canon Kabushiki Kaisha, Tokyo, Japan

[21] Appl. No.: 428,956

[22] Filed: Sep. 30, 1982

Related U.S. Application Data

[63] Continuation of Ser. No. 169,103, Jul. 15, 1980, abandoned.

[30] Foreign Application Priority Data

Jul. 16, 1979 [JP] Japan .................................. 54-91172
Jul. 16, 1979 [JP] Japan .................................. 54-91174
Jul. 16, 1979 [JP] Japan .................................. 54-91176

[51] Int. Cl.$^3$ ...................... G03G 15/00; G03B 27/76

[52] U.S. Cl. ...................................... 355/14 E; 355/8; 355/69

[58] Field of Search .................. 355/3 R, 14 E, 8, 69, 355/71, 11, 67, 14 R

[56] References Cited

U.S. PATENT DOCUMENTS

3,237,516 3/1966 Shearer et al. ........................ 355/11
3,528,738 9/1970 Hodges ............................... 355/8 X
3,724,942 4/1973 Gibson et al. ....................... 355/8 X
4,205,912 6/1980 Yamaguchi et al. .................. 355/15

*Primary Examiner*—Richard L. Moses
*Attorney, Agent, or Firm*—Fitzpatrick, Cella, Harper & Scinto

[57] ABSTRACT

Image forming apparatus is provided with a rotating body, a device to form an image on the rotating body, a device to transfer an image formed by the image forming device onto a transfer member, and a light source to radiate light over the rotating body controller controls the power supply to the light source prior to image formation to thereby control the quantity of light from the light source before commencement of image formation. The rotating body is rotated in such a manner that after power supply control by the controller, no image is formed at a bright and dim light quantity changeover position with respect to the rotating body.

19 Claims, 43 Drawing Figures

IMAGE FORMING APPARATUS WITH ADJUSTABLE LIGHT SOURCE

This is a continuation of application Ser. No. 169,103, filed July 15, 1980, now abandoned.

BACKGROUND OF THE INVENTION

1. Field of Invention

This invention relates to an image forming device such as a transfer type copying machine, etc.

2. Description of the Prior Art

In the conventional transfer type electrophotographic devices, photosensitive changes occur if photosensitive elements are left without using them for many hours. Such sensitivity changes include long-term changes such as deterioration in response in relation to the life of photosensitive elements and so on as well as temporary ones attributable to moisture absorption, influence of residual surface charge and irregularities in sensitivity due to leak light, etc. As a means of solving these problems, it has been proposed, prior to proceeding to a process sequence, to provide a photosensitive element with light beforehand for a specified time and, in so doing, cause it to rotate so as to maintain the sensitivity (response) of the photosensitive element at a certain level or make it uniform.

However, especially when preliminary exposure is performed for many hours directly before the commencement of a first sheet cycle, or when it is performed with a strong light source, there has been a possibility of an initial deterioration of the photo-sensitive characteristics (response) of the photosensitive material due to a fatigue of the rotating photosensitive element, resulting in the deterioration of the latent image of the first sheet.

Further, there has also been such a possibility when a strong light source is employed to eliminate a residual image after transfer. On the other hand, however, if pre-exposure is started before a fixed time of image formation and image exposed during pre-exposure, an image may be formed at the boundary between preexposed and non-preexposed planes, resulting in the possibility of irregularities being produced in the first sheet.

Further, in cases where preexposure as mentioned above and postexposure after image formation are carried out in a small copying apparatus, the distance between the document platen glass, optical system, photosensitive element, etc. and the light sources for pre- and post-exposure is made shorter and there is the possibility of the platen glass, etc. being heated and broken due to temperature rise of the light sources.

Such possibility has been greater especially in the case of a compact type apparatus where bar lens or optical fiber is employed as the optical system for image exposure on the rotating photosensitive element due to the extreme proximity of the platen glass to the rotating photosensitive element. Further, there has been a danger especially when strong halogen lamps are employed as light sources for pre- and post-exposure.

On the other hand, when making the transfer type apparatus smaller in size, it is necessary to provide essential means for the execution of the process in quite close order and accordingly, so that providing the means for pre- and post-treatment of the photosensitive element makes the apparatus more complicated and causes inconvenience of maintenance; for such reasons, real miniaturization has almost been hopeless.

On the other hand, there has been an apparatus in which the rotating element contributing to transfer is rotated, after power-on to the apparatus, for pre-exposure or cleaning.

On the other hand, in ordinary copying apparatuses, if power is switched on prior to the beginning of use, the apparatus itself diagnoses as to whether the condition suitable for copying is existing and no copying is effected if various requirements are not met. Such requirements include the availability of transfer material, developer and key counter, etc. and heater temperature at the fixing roller, etc. Especially, the temperature of the fixing roller at the time of power switch ON is not at a temperature making fixing possible nearly at each time.

Accordingly, if rotation of the rotating body is caused to follow various factors mentioned above, rotation time or number of rotations may extend over many hours and for this reason, there has been the possibility of deterioration of photosensitivity as previously mentioned or damage to the surface of the rotating body. In addition, standby time till the commencement of exposure becomes long, resulting in impeding speedup of copying work.

Further, it has hitherto been known that in a transfer type of copying apparatus, if a jammed sheet condition is detected, all the sheet feed members inclusive of the rotating body and fixing rollers, etc. are stopped so as to prevent a further aggravated condition of jammed sheet.

In such a case, jamming occurs mostly during a copy cycle and therefore the electric potential at the rotating body is not uniform. Especially, on the surface of the rotating body from the charger to the discharger such as light source, etc. downstream in the direction of rotation of the rotating body, charge from the charger remains and the machine is left in such condition. Such residual charge remain as memory on the rotating body and may produce mottle on the first sheet at the time of resumption of copying.

Further, in the past, when stopping the operation of an apparatus on detection of jamming of a sheet, a mechanical lock was applied so as to prevent operation of the apparatus till completion of elimination of jamming and therefore, unlocking of such lock was troublesome and the device for such unlocking was quite expensive.

In addition, elimination of jamming was carried out by opening the casing of the apparatus, but even if the casing was not closed completely after elimination of jamming, the apparatus happened to restart running in some cases, bringing about quite a dangerous condition.

On the other hand, it has hitherto been known, in a copying apparatus equipped with copying setting switches such as number of copy sheets setting key switch, copy start switch and copy stop key switch, etc., to provide segment indicators and lamps, etc. to let the operator know that various key switches were pressed and the signals accepted by the control unit provided in the inside. Further, it is already known to employ indication means such as lamps and light emission diodes, etc. for the purpose of alarm at the time of failure such as jamming at a copying apparatus. However, these two systems, if employed in a copying apparatus, caused an increase of costs or made the control and indication units of a copying apparatus complicated. Moreover, it often took time to judge the contents of indication, resulting in a loss of copying time.

SUMMARY OF THE INVENTION

An object of this invention is to provide an image forming apparatus that has eliminated the abovementioned disadvantages.

Another object of this invention is to provide a transfer type of image forming apparatus with a rotating photosensitive body properly processed so as to obtain a satisfactory image starting from the first sheet.

A further object of this invention is to provide a transfer type of image forming apparatus in which latent image mottles on the rotating photosensitive body are minimized.

Another object of this invention is to provide sequence control capable of preventing temperature rise at and around the light source in a transfer type of image forming apparatus in which light is radiated to the rotating photosensitive body in using a strong light source.

Another object of this invention is to provide improvements and sequence control of a transfer type of image forming apparatus in which various processes are handled using a common light source.

Another object of this invention is to provide an image forming apparatus to determine an optimum pretreatment time of the rotating body by rationally combining the standby time being indispensable until various conditions to make copying possible are set up with the time required for the sensitive element sensitivity equalizing process or the cleaning process.

Another object of this invention is to provide a transfer type of image forming apparatus in which after machine stop due to transfer paper jamming or other malfunction, a high quality image can be obtained from the beginning.

Another object of this invention is to provide an image forming apparatus in which after machine stop due to jamming or other malfunction, resumption of image formation is made possible by simple means.

Another object of this invention is to provide an image forming apparatus in which safety relative to opening and closing of the casing has been elevated greatly.

Another object of this invention is to provide an image forming apparatus in which the malfunction indication unit, etc. is simplified and yet the contents of control and alarm can be transmitted to the operator promptly and simply.

Another object of this invention consists in an improvement of a compact copying apparatus employing an optical system for image exposure such as fiber array and so on.

The above and other objects of this invention are clear from the following preferred embodiments.

BRIEF DESCRIPTION OF THE DRAWINGS

FIGS. 15A-1, 15A-2 and 15A-3, when combined as shown in FIG. 15, show an indication, key entry and sequence control circuit diagram;

DESCRIPTION OF THE PREFERRED EMBODIMENTS

Figure 1:
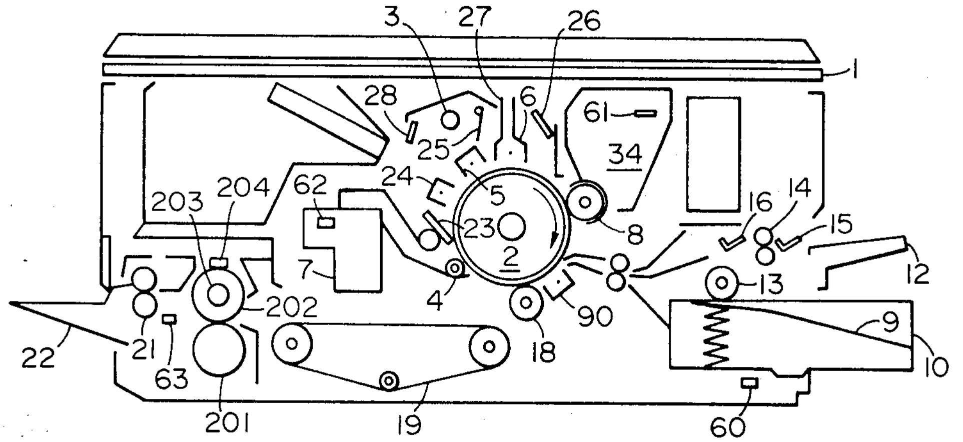
FIG. 1 is a sectional view of the image forming apparatus according to this invention.

Embodiments of the present invention will hereinafter be described with reference to the drawings. Referring to FIG. 1 which is a cross-sectional view of the copying apparatus according to the present invention, the copying apparatus includes a reciprocable platen 1 for supporting an original thereon, a rotatable drum 2 having a seamless photosensitive medium on the periphery thereof, a lamp 3 for exposing the drum 2 to the original image on the platen 1, a corona charger 5 for precharging the surface of the photosensitive medium to the positive polarity, a corona charger 6 for discharging the surface of the photosensitive medium to the negative polarity with the exposure image, a developing device 8 for developing an electrostatic latent image, a charger 90 for transferring the developed image to transfer paper, a cassette 10 containing a number of sheets of transfer paper therein and removably mounted on the apparatus body, a bed 12 for manually supplying transfer paper, a roller 13 for feeding the transfer paper from the cassette, a pair of rollers 14 for feeding the transfer paper from the manual supply bed 12, microswitches 15 and 16 for detecting the manually supplied transfer paper, a pair of register rollers 17 for registering the leading end of the transfer paper to the leading end of the image on the drum, a roller 18 for separating the transfer paper from the drum, a belt 19 for conveying the transfer paper, fixing rollers 201, 202 rollers 21 for discharging the transfer paper into a tray 22, a blade cleaner 23 for removing any remaining toner from the drum, a magnet roller 4 for collecting the toner removed by the blade 23, a container 7 for containing the toner collected by the roller 4, a minus corona charger 24 for removing any remaining charge on the drum, a shutter 25 for imparting the light from the exposure lamp 3 directly to the exposured surface of the drum for a predetermined time, mirrors 26 and 28 for imparting the light from the lamp 3 directly to the surface of the drum, and a cellfock lens 27 for causing the light of the lamp 3 reflected from the original to be imaged on the surface of the drum.

Operation will now be described. When a main switch is closed, a motor for driving the drum 2 is energized and the lamp 3 is turned and the shutter 25 is opened while, at the same time, the corona charger 6 is energized and the drum 2 is rotated. Thereby, the drum surface is precleaned to remove any remaining toner and charge and memory therefrom. When the fixing rollers 201, 202 is heated to the fixing temperature by an internal heater, a copy signal is generated. Where a copy switch is not closed or where a sheet is not manually inserted, the drum still continues to rotate thereafter and, when a predetermined number of pulses from a rotary encoder provided in the drum driving system and adapted to generate n pulses for one full rotation of the drum are counted, the drum is stopped from rotating. The above-described drum rotation is referred to as the first pre-rotation.

When the copy switch is closed or a sheet is manually inserted during the rotation or the stoppage of the drum, the shutter 25 is closed and the drum 2 makes substantially one full rotation (hereinafter referred to as the second pre-rotation), whereafter the platen 1 starts its forward movement and the original on the platen 1 begins to be slit-exposed. The drum is slit-exposed to the reflected image of the original through the cellfock lens. The photosensitive medium of the drum comprises, in succession from the surface thereof, an insulating layer, a photoconductive layer and an electrically conductive layer and when the surface charged by the charger 5 reaches an exposure surface, plus charge is removed by the minus charger 6 and the optical image. When that surface reaches an uniform exposure surface, an electrostatic latent image of high contrast is formed on the drum surface by the light from the mirror 26. The latent image is imparted with toner at the developing area and developed into a visible image. The visible image is transferred to transfer paper at the image transfer area by the plus potential of the image transfer charger. The transfer paper is one which has been fed there by the timing operation of the paper feed roller 13, and passes through the image transfer area at the same velocity as the peripheral velocity of the drum with the aid of the register rollers 17. After the image transfer, the transfer paper is separated from the drum by the roller 18 and conveyed to the fixing rollers 201, 202 by the belt 19, whereby the image on the transfer paper is fixed, where after the transfer paper is discharged into the tray 22 by the roller 21. After completion of the image transfer, the drum surface is cleaned by the blade 23 and discharged by the charger 24 and the memory thereon is removed by the light from the lamp 3 through the mirror 28.

Where continuous copying is effected from the same original, the platen 1 repeats its reciprocal movement over a number of times set by the ten key of the apparatus operating portion.

Figure 2:
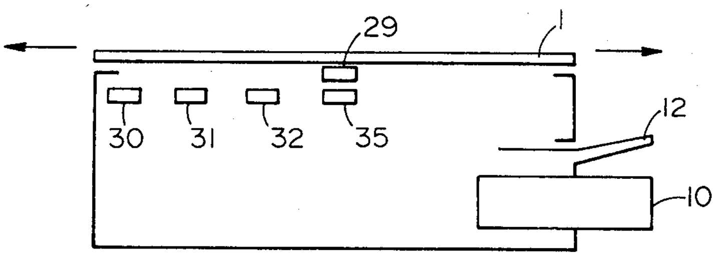
FIG. 2 is a sectional view of the carriage in FIG. 1.

FIG. 2 shows a portion around the platen. The platen has a magnet thereon, and reed switches 30, 31, 32 and 33 adapted to be actuated by the passage of the magnet are disposed on the movement path of the platen. When the magnet actuates the reed switch 35, the platen is stopped at its initial position in the center of the body, and when the magnet actuates the reed switch 30, the platen is changed over to the rightward or forward movement for the exposure. The switch 31 is for feeding paper by the paper feed rollers 13 and 14, and the switch 32 is for feeding paper by the register rollers 17. In the case of continuous copying, when the first slit scanning is terminated and the platen is backwardly moved to actuate the switch 30, the platen again starts its forward movement and effects the second scanning. In this manner, a set number of copies are obtained. The lamp 3 and simultaneous charger 6 are turned on in synchronism with the rotation of the main motor, namely, the drum, and the primary charger 5 and precharger 24 are turned on except during the postrotation cycle. The lamp 3 is controlled so as to emit a high intensity of light during the scanning movement of the platen.

In the case of the manual supply copying, when a sheet is inserted from the bed 12, the detector 15 detects the sheet. Then, the feed rollers 14 are operated to introduce the sheet into the apparatus. However, the rollers 14 are not operated for a predetermined time (about two seconds) after the detector 15 has detected the sheet. This time allowance is for preventing oblique insertion of the sheet or for correcting the sheet to assure straight movement or enabling the sheet to be replaced by another one. When that time has elapsed, the rollers 14 are operated and also the drum 2 is rotated to carry out a process sequence similar to that in the case where the copy switch is closed. The drum 2 starts the second pre-rotation as soon as the detector 15 detects the sheet, whereby the copy starting time can be quickened. Also, when the sheet insertion is detected by the detector 15, the feeding of sheets from the cassette is stopped. In the manner described above, copying can be started simply by inserting a sheet without closing the copy switch of the operating portion, and the sheet is fed into the apparatus while maintaining an accurate sheet position, so that the toner image can be transferred to the sheet at a predetermined location thereof and jam of the sheet can be prevented.

When the switch 16 detects that the trailing end of the sheet has passed this switch, the rollers 14 are stopped, thus becoming prepared for the insertion of the next sheet.

Figure 13:
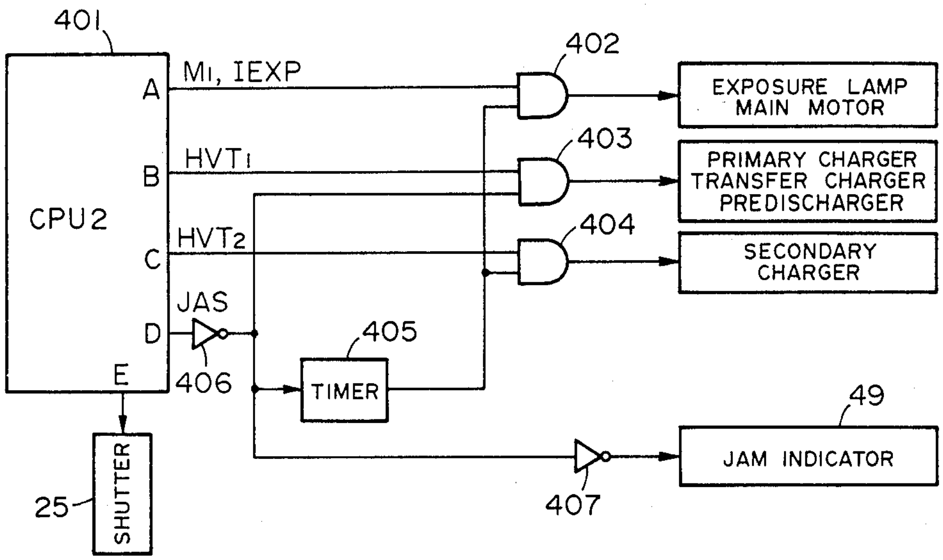
FIGS. 13 and 14 are JAM postrotation control circuit diagrams.

Now, a plurality of such detectors 15 may be provided at a right angle to the direction of sheet feed. These are for detecting oblique movement of a sheet and the rollers 14 are not operated until both of the detectors detect a sheet. Also, design may be made such that the second operation of the rollers 14 takes place only when there are outputs both of the detectors 15 and 16, as shown in FIG. 13. Thereby, jam can be prevented.

Figure 3:
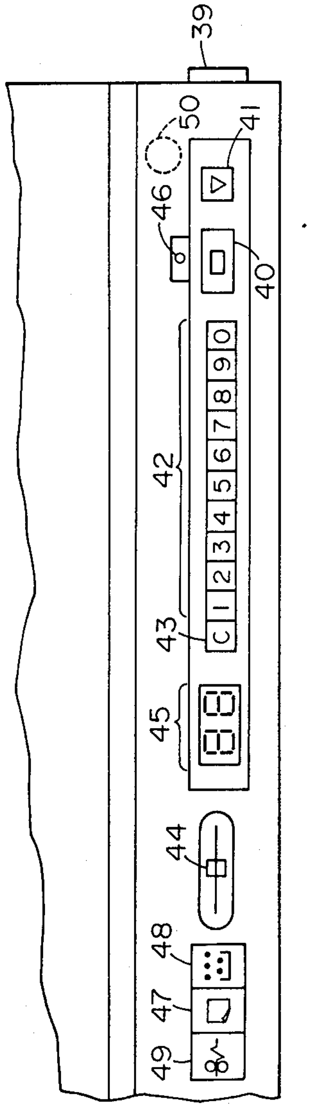
FIG. 3 is a partial plan view of the FIG. 1 apparatus.

FIG. 3 is a plan view of the operating portion of the FIG. 1 copying apparatus. It includes a main switch 39, a copy start key switch 40, a stop key switch 41 for interrupting continuous copy, a ten key 42 for causing a number to be stored in a memory to set the number of continuous copies, a clear key 43 for clearing the number stored in the memory, a copy gradation setting lever 44, a 7-segment displayer 45 for the memory number, a wait lamp 46 adapted to be turned on for display until the fixing temperature, a lamp 47 for displaying the absence of the cassette and of sheets in the cassette, and a lamp 48 for displaying when the container 7 for collecting the used toner by the cleaner is filled with such toner. Designated by 49 is a displayer for displaying when a sheet jams. When a sheet is jamming, the clear key and the ten key are not operated, but during the waiting, these keys are operable.

The segment displayer 45 displays a zero-suppressed 1, irrespective of the waiting, upon closing of the main switch 39, displays the set number minus 1 upon termination of each copy, and again displays the set number upon completion of the set number of copies and thereafter, when 30 seconds elapses without the copying being started, it again displays 1. Thereby, one-sheet copying can be started without the number setting by the ten key and the re-start of the copying can be executed smoothly.

The wait displayer 46 is turned on and off by the closing of the main switch 39, and is statically turned on when the temperature of the fixing rollers is not reduced below the fixing temperature, namely, when a short time has elapsed after the previous operator has opened the main switch 39, but is turned on and off when the temperature of the fixing rollers is below the fixing temperature (wait). The wait displayer is turned on also when the waiting time has elapsed after the fixing rollers have risen to the fixing temperature. When the main switch is opened, both the turn-on-and-off and the turn-on condition are extinguished and the wait displayer displays the main switch off condition. Further, when the copy switch is closed after wait-up, turn-on-and-off operation having a longer turn-on-and-off interval than that during the waiting is effected until the mode shifts to the post-rotation mode. That is, a single wait displayer can display four conditions, namely, the closed main switch condition, the wait condition during which copying is impossible, the ready-to-copy condition, and the copy cycle and thus, the number of displayers can be saved and this contributes to reduced cost of the apparatus.

An overflow displayer 48 detects and displays the overflow condition of the container 7 and also detects deficiency of toner in the developer container 33, whereupon it is statically turned on for display. In the former case, a lamp may be turned on and off and in the latter case, the lamp may be statically turned on.

The paper absence displayer 47 may be turned on and off in case of the absence of paper, and may be statically turned on in case of the absence of the cassette.

Also, when toner deficiency in a hopper 33 or the overflow of the collecting container 7 is detected and where the continuous copying for the number of sheets set by the ten key is being executed, the copying is continued until the set number of copies is completed and thereafter, re-start of the copying is prevented. Thus, the display for warning is effected, but it is prevented that the copying is immediately interrupted to make the series of copying operations stagnant and aggravate the substantial copying speed, because even if the toner is deficient or overflow takes place, neither the image will be suddenly aggravated nor the apparatus will be contaminated. When transfer paper jams, the operation of the apparatus is immediately stopped to secure the safety of the apparatus. For the stop key, paper absence and cassette absence signal, the operation of the apparatus is not immediately interrupted but the then process cycle is permitted to complete, where after the start of the subsequent cycle is prevented.

Figure 4:
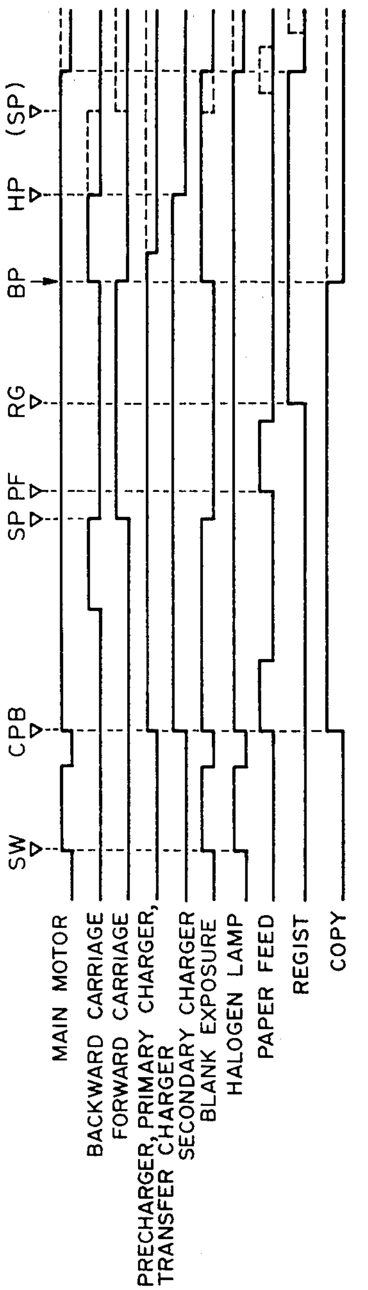
FIG. 4 is an operation time chart of the apparatus shown in FIG. 1.

With reference to FIG. 4 which is an operation time chart of the FIG. 1 copying apparatus, the operation sequence of scanning and the operation timing will be described in detail.

Before the copy switch 40 is closed, the platen 1 is positioned centrally of the body as shown in FIG. 1. When the copy switch 40 is closed, the pre-discharging charger 24, the lamp 3, the primary charger 5, the secondary charger 6, the image transfer charger 9 and the shutter 25 are energized, so that pre-corona, primary corona, secondary corona, image transfer corona, pre-discharging exposure, blanket exposure and uniform exposure are imparted to the photosensitive medium, which thus becomes ready to start copying. The lamp 3 is turned on with weak light.

When said predetermined number of pulses are counted, namely, when the drum makes a predetermined rotation, the platen 1 begins to move from the position of FIG. 1 to the left, and thereafter when the drum has made substantially one full rotation, the switch 30 is closed and therefore, the platen is stopped, and then starts to move rightwardly for exposure. The lamp 3 is now turned on with intense light and the shutter is deenergized to stop the blanket exposure and effect the exposure. The blanket exposure is an exposure whereby, when image exposure is not taking place, light is applied to the image-exposed surface so as to prevent occurrence of irregularity in the potential on the photosensitive medium. Also, by changing over the lamp between the intense light and the weak light, various process exposures can be appropriately accomplished by a single lamp.

After image exposure has been done over substantially one full and half rotation, the movement of the platen 1 is stopped and then the platen is moved to the left. The start of this movement is effected by counting said predetermined number of pulses, and the number set in the memory is set in a register for copy counter and 1 is subtracted from that number. As a result, the content of the register becomes 0 in the case of a single sheet copy and thus, the re-start of the subsequent copying cycle is prevented. During this rightward movement, the reed switch 31 of FIG. 2 is actuated to operate the paper feed roller 13 or 14 and the reed switch 32 is actuated to operate the register roller 17, thereby feeding a sheet. Even if the reed switches 31 and 32 are actuated during the platen movement at the other time than exposure, the rollers 13, 14 and 17 will not be operated.

When the platen 1 actuates the switch 35 in its initial position, it is stopped from moving. Then, the lamp 3 is controlled to its weak turn-on and the shutter is operated to start the blanket exposure by the weak turn-on of the lamp 3. Thereafter, the drum rotation is continued so that the photosensitive medium is electrically and mechanically cleaned and, after substantial one full rotation of the drum, and process load as shown in FIG. 4 is removed and the drum rotation is stopped. After this stoppage, the main switch on condition is continued.

In the case of continuous copying, even if the switch 35 is closed, the platen 1 is not stopped but continues to move leftwardly and when it actuates the switch 30, rightward movement of the platen 1 is again started and turns on the lamp 3 with intense light and deenergizes the shutter, thus re-starting the image exposure.

In the present embodiment, one cycle of exposure scanning is effected with the platen being changed twice in its direction of movement and therefore, as shown in FIG. 1, the platen can be set at the center during stoppage of the copying. Also, copies of a full size corresponding to the body size can be produced and this leads to compactness of the machine. Moreover, the control of the two changes in direction is effected by the platen position switches and pulse count timer and this eliminates the necessity of providing a complicated spring mechanism for changing the direction. Further, the reed switch 35 is provided with a plurality of functions which will later be described and thus, any cumbersomeness caused by the reed switch which would otherwise result from the compactness of the machine may be prevented.

The time whereat the rightward movement for exposure should be stopped and the direction of movement should be changed is determined in accordance with the size of sheets in the cassette 10 and the size of the sheet manually supplied from the manual supply bed 12.

Some of the foregoing and the following embodiments of the present invention are also applicable to copying apparatus which have a first mirror movable at a velocity of V and a second mirror movable at a velocity of $\frac{1}{2}$V and in which exposure scanning is effected by reciprocal movement of these mirrors, and are also applicable to copying apparatus in which a roll of paper is cut into the length of the size original on the platen and the thus cut paper is automatically fed, or to copying apparatus in which the latent image on the drum is transferred to a sheet and such sheet is developed. The present invention is also applicable to copying apparatus in which copy image is directly formed on a sheet without the intermediary of a drum or to copying apparatus in which other data than an original document is printed on a sheet.

Figure 5:
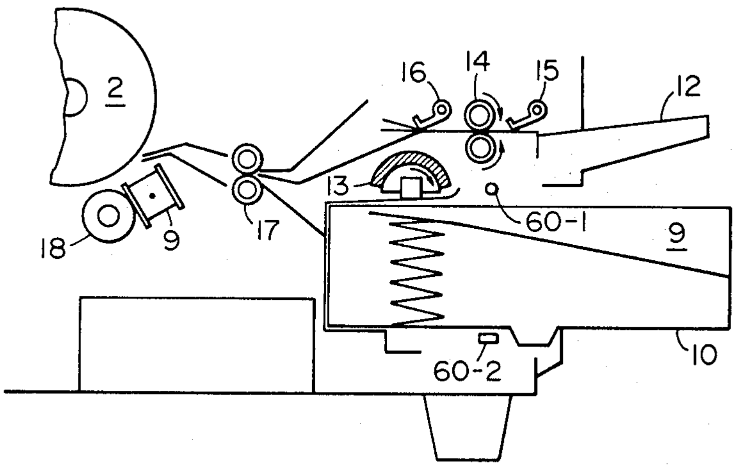
FIG. 5 is a sectional view of the paper feed unit shown in FIG. 1.
Figure 6:
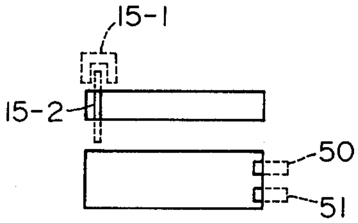
FIG. 6 is a right front view of the FIG. 5 apparatus.

FIG. 5 is a vertical cross-sectional view of the cassette portion and manual supply portion, and FIG. 6 is a plan view thereof. Designated by 15-1 is a photo-interrupter constituting a manually supplied sheet detector 15, denoted by 15-2 is an actuator piece swingable upon insertion of a sheet, and designated by 50 and 51 are microswitches adapted to be actuated by a cam provided on the cassette when the cassette is mounted in the apparatus body. When both of the switches 50 and 51 are in OFF position, there is generated a signal meaning the absence of a cassette; when the switches 50 and 51 are in ON and OFF positions, respectively, there is generated a signal meaning the presence of a cassette having sheets of the half-size, namely, A4 or B5 size; when the switches 50 and 51 are in OFF and ON positions, respectively, there is generated a signal meaning the presence of a cassette having sheets of B4 size; and when both of the switches are in ON position, there is generated a signal meaning the presence of a cassette having sheets of the full-size, namely, A3 or B4 size. The three different signals for these sizes are used to determine the exposure stroke of the platen 1.

With regard to manually supplied sheets, the full-size includes B4 size and so, the two sizes, i.e. the half-size and the full-size are detected by the sheet detector 15.

Accordingly, where sheets are continuously fed from the cassette to execute the production of multiple copies, the copying cycle is repeated at a stroke corresponding to each size, namely, in a minimum time, whereby the time required for the copying can be reduced. This, coupled with the aforementioned effect of making sheet pick-up for the next sequence prior to the completion of the present sequence to thereby reduce the copying interval, provides an excellent merit. However, in the case of manual sheet supply, it is rare that sheets are continuously fed and therefore, two series of stroke controls suffice and this leads to simplification of the control circuit and reduced malfunctioning related to the size detection.

The actuator piece of the sheet detector 15 is provided at the left end, as is shown in FIG. 6. This position corresponds to a belt provided outside of the image formation area of the drum to separate transfer paper from the drum after image transfer. This enables judgement as to whether or not a manually supplied sheet has been inserted into a separable predetermined position.

The sheet detector 16 is provided at the same left end position as the sheet detector 15 with respect to the photosenstitive medium. This detector 16 has the following three functions. A first function is to detect the size of a manually supplied sheet and when the detector 16 does not detect a sheet at a predetermined time, the size of the sheet is judged as the half-size and when the detector 16 detects a sheet at the predetermined time, the size of the sheet is judged as the full-size. A second function is to render the length of the path from the leading end of a manually supplied sheet to the register rollers equal to the length of the path from the cassette sheet. Also, where the path to the register rollers is relatively long, the flexure of the sheet formed by the sheet striking against the register rollers is not always constant so that the image transfer registration is sometimes unstable. This can be prevented. That is, when the detector 16 detects a sheet fed by the manual supply rollers 14, these rollers 14 are deactivated after a predetermined time and wait while becoming prepared to feed the sheet to the register rollers. The rollers 14 are again operated by the signal from the reed switch 31 and begin to feed the sheet to the register rollers. A third function is to stop the rollers 14 when the detector 16 detects the trailing end of the sheet, and to become prepared for the next sheet.

The operation of the sheet detector 15 detecting a sheet to operate the rollers 14 and of the sheet detector 16 detecting that sheet to deactivate the rollers 14, namely, the preparatory feeding and waiting, is for preventing the function of the register rollers from being damaged and more particularly, for ensuring the mountain of the loop (flexure) of the sheet formed by the sheet striking against the stopped register rollers to be kept down to a suitable range. Accordingly, there is no possibility of sheets being broken or jamming. Moreover, this is accomplished by a single roller, which leads to ease and lower cost with which the machine is made compact.

This also holds true with the paper feed from the cassette. That is, the paper feed roller 13 is operated for a little time by the closing of the copy switch to pull out a sheet from the cassette, and then the feed roller 13 waits. The reed switch 31 starts to feed the so pulled out sheet until the sheet reaches the register rollers.

FIG. 5 shows the form of a sheet near the register rollers 17. The cassette roller 13 is of a semicircular cross-section and makes a half rotation to effect preparatory feeding, and makes a further half rotation to effect main feeding.

The present embodiment, as described above, is an image transfer type copying apparatus which is constructed by using the image scanning system provided by the reciprocal movement of the seamless photosensitive drum 2 and the platen 1 and the image exposure system for the drum provided by the cellfock lens 27, namely, the one-to-one magnification bar lens and in which the construction is improved for the purposes of further compactness, higher performance and lower post. That is, the copying apparatus of the present embodiment has been made compact with the copy interval reduced and with the image transfer registration maintained well by the control for the change-over of the optical path by using a single lamp for various exposures, the sheet feed control for preventing an increase in number of timing rollers resulting from the sheet path, and the smooth control of changes in direction of the platen by low-cost means. Moreover, in the constuction of the present embodiment, the copy size is not fixed, two series of feed paths are provided so as not to restrict the types of copy sheet, malfunctioning is eliminated and sheet jam can be prevented to the utmost. If the cellfock lens 27 is provided in a space forming the shortest distance between the drum 2 and the platen 1, as shown in FIG. 1, it will be very effective to make the apparatus compact.

(Controller)

Figure 7A:
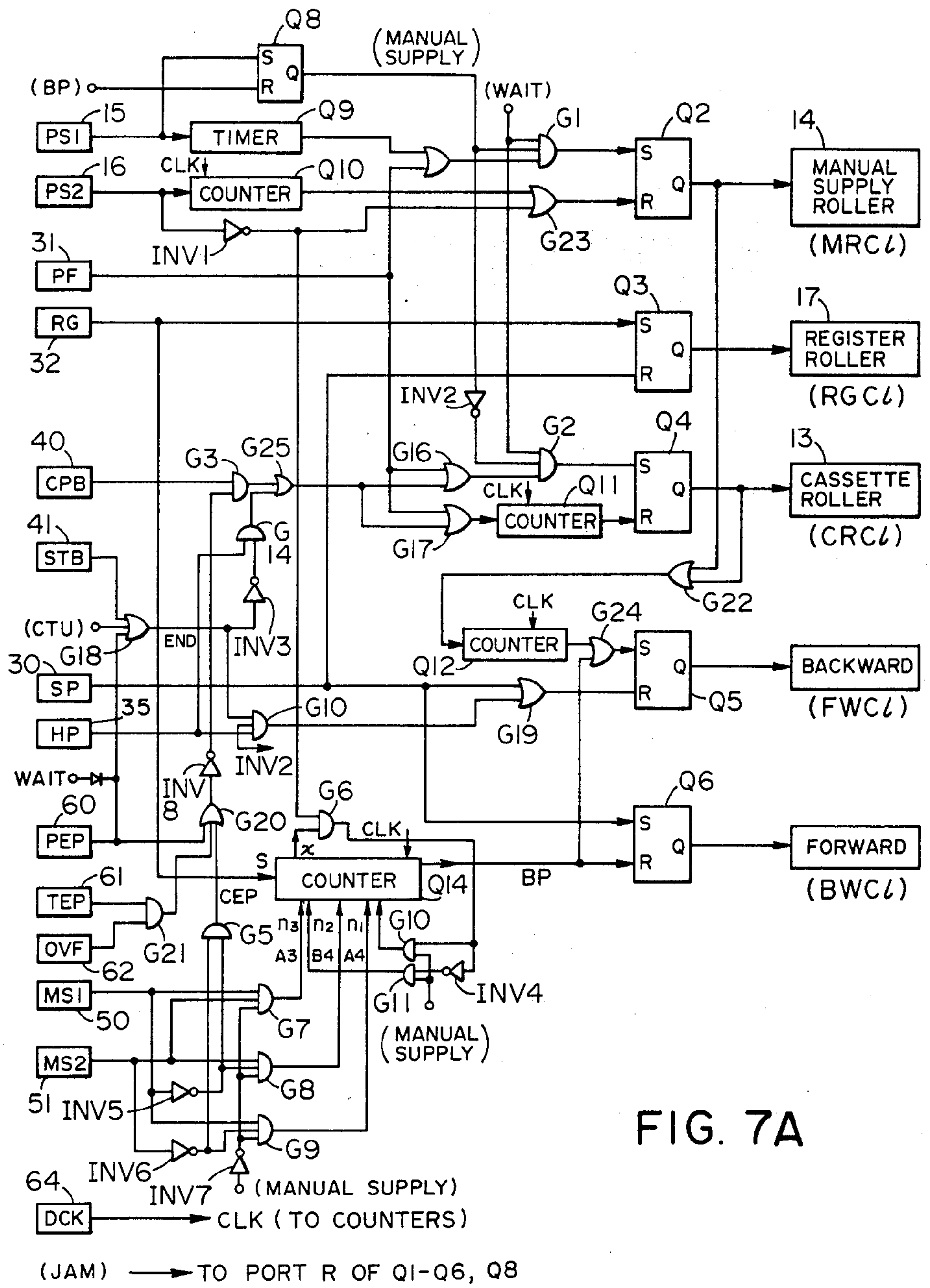
FIGS. 7A and 7B represent examples of the control circuit shown in FIG. 1.
Figure 7B:
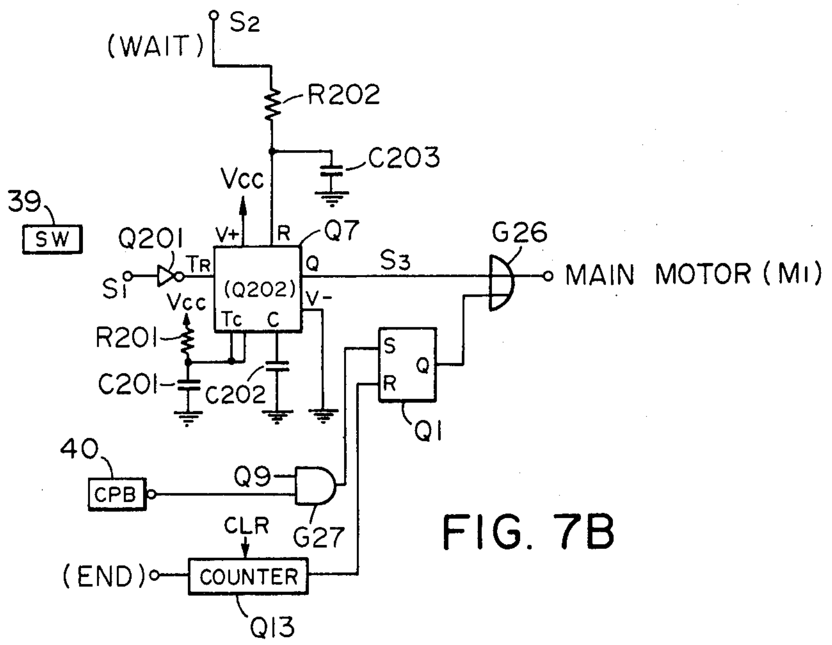
Figure 7C:
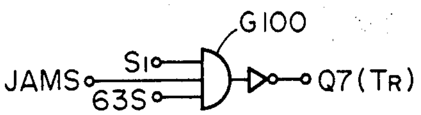
Figure 8A:
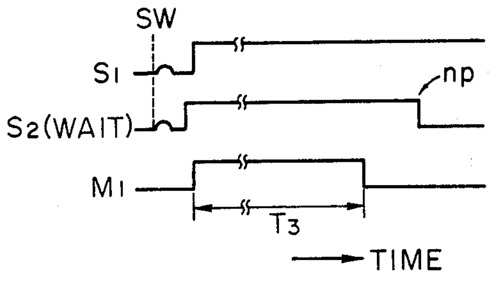
FIGS. 8A, 8B and 8C are control time charts for the circuit shown in FIG. 7B.
Figure 8B:
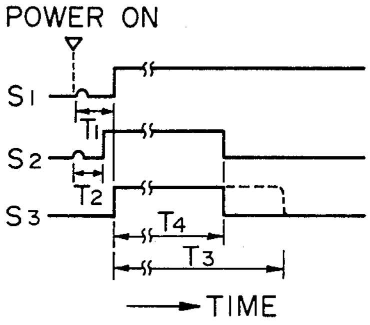
Figure 8C:
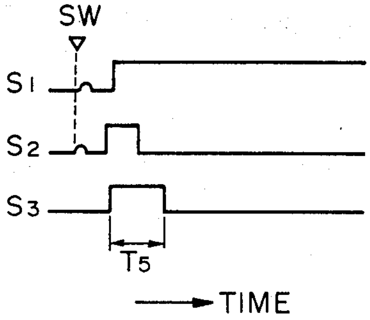
Figure 9:
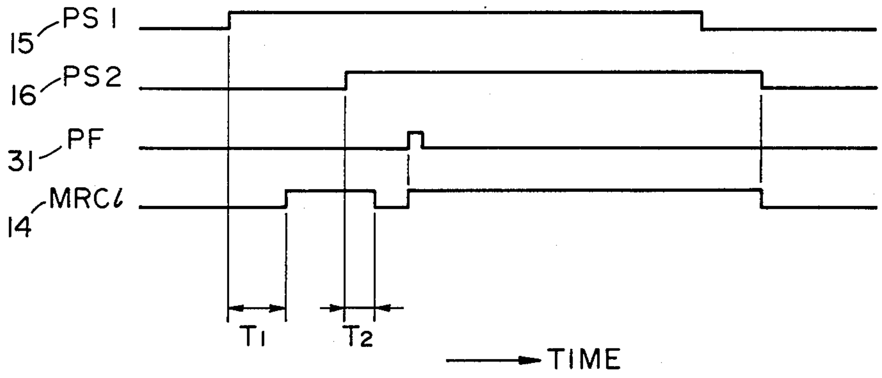
FIG. 9 is a control time chart for the circuit depicted in FIG. 7A.

FIGS. 7A, 7B and 7C are diagrams of the operation control circuit of the FIG. 1 copying apparatus. $Q_1$–$Q_6$ designate flip-flops for operatively controlling a main motor (which operates the drum 2, various rollers and the belt 19), a clutch for operating the manual supply rollers 14, a clutch for operating the register rollers 17, a clutch for operating the cassette roller 13, a clutch for backwardly moving the platen 1, and a clutch for forwardly moving the platen 1. The flip-flops $Q_1$–$Q_6$ are switched on by a pulse rising signal to a port S, and switched off by a pulse rising signal to a port R. $Q_7$ designates a one-shot for effecting the wait control of the main motor and it generates an output of time limit $T_3$ as shown in FIGS. 8A–8C after the closing of the main switch. $Q_8$ designates a flip-flop for judging the manual supply mode and the functions of the ports S and R thereof are identical to those of the flip-flop $Q_1$ except that it is not an edge trigger. $Q_9$ denotes a timer for operating the manual supply rollers 14 and generating an output after a time limit $T_1$ as shown in FIG. 9, and it is operable on condition that an input signal shall be ON for the time $T_1$. That is, the timer $Q_9$ can complete its timer operation as long as there is an input signal, and cancels its timer operation when the input signal disappears. $Q_{10}$–$Q_{13}$ denote counters for counting clock pulses generated by the drum rotation from the point of time whereat the input signal has been entered and for generating a pulse output when the count reaches a predetermined count number. The counters $Q_{10}$ and $Q_{11}$ are for determining the deactivation of the manual supply rollers and of the cassette roller, and the counters $Q_{12}$ and $Q_{13}$ are for determining the number of pre-rotations and the number of post-rotations. N (a predetermined number) clock pulses DCK are generated at equal intervals per full rotation of the drum by the aforementioned rotary encoder. $Q_{14}$ is a counter similar to the counters $Q_{10}$–$Q_{13}$, but in the case of the cassette mode, it selects a preset number in accordance with the size of the cassette and in case of the manual supply mode, it selects a preset number in accordance with the size of a manually supplied sheet in a mode different from the cassette mode. The counter $Q_{14}$ is for controlling the stroke of the platen. $G_1$–$G_{10}$ designate AND gates, $G_{13}$–$G_{23}$ denote OR gates, and $INV_1$–$INV_6$ designate inverters.

Signals $M_1$, MRCl, RGCl, CRCl, FWCl and BWCl are the signals for operating the main motor, the manual supply roller, the register rollers, the cassette roller, the forward movement of the platen and the backward movement of the platen when these signals are 1, and for deactivating these members when the signals are 0; CLK is a clock pulse; BP is a signal for reversing the platen; and END is a copy cycle interrupting signal provided by signals STB, CTU, PEP and CEP for the stop key, count up, and paper/cassette absence. "Manual Supply" is a signal indicative of the manual supply mode; JAM is a signal indicative of sheet jam and generated upon detection of jam; CTU is a count-up signal of the copy counter indicative of a preset number of copies having been completed; and SW is a main switch on signal put out upon detection of the condition of the switch SW. $PS_1$ and $PS_2$ are signals put out when a manually supplied sheet is detected by the detectors 15 and 16; PF and RG are a paper feed signal and a registration signal generated when the platen has actuated the reed switches 31 and 32 as aforementioned; CPB and STB are signals generated when the copy button and stop key of the operating portion are operated; and SP and HP are signals generated when the platen has actuated the read switches 30 and 35 and indicative of the plate forward movement start position and stop position. PEP is a signal put out when the emptiness of the cassette 10 has been optically detected by a lamp 60-1 and a light-receiving member 60-2, and CEP is a signal indicative of removal of the cassette 10 and put out by microswitches 50 and 51 operatively controlled by the cassette ON. TEP is a signal indicative of the absence of toner in the developing device 34 and put out when it is detected by a toner level detector 61 in the developing device that the level of the toner has lowered below a predetermined level, and OVF is a signal indicative of the overflow condition of the collected toner in the collecting container 7 and put out when the overflow is detected by a level detector 62. WAIT is a signal indicative of the wait condition and put out by a thermistor Th which detects the temperature of the fixing roller.

Operation will now be described. During the duration of the wait signal WAIT generated upon closing of the main switch 39, the one-shot $Q_7$ of FIG. 7B is operated and a main motor signal $M_1$ is put out through the gate $G_{26}$ for a time $T_3$ to effect a first pre-rotation of the drum. Thereafter, if the copy button is depressed when the wait is up (WAIT is 0) and standby has come, the flip-flop $Q_1$ is set and likewise the main motor is energized to start the process.

(Cassette Mode)

Now no sheet is being inserted from the manual supply bed 12 and therefore, the detector 15 is OFF and accordingly, the flip-flop $Q_8$ is OFF and consequently, a manual supply signal is not put out and accordingly, the gate $G_1$ is OFF-controlled and the flip-flop $Q_2$ is not set and thus, the manual supply rollers 14 are not operated.

Assuming that paper is absent and toner is absent and no overflow is occurring, start signal is entered into the gate $G_2$ through the gates $G_3$, $G_{25}$ and $G_{16}$ upon depression of the copy key. Since wait and manual supply reversing signals (all being 1) are applied to the other port of the gate $G_2$, the flip-flop $Q_4$ is set on and the clutch of the cassette roller 13 is engaged. While the counter $Q_{11}$ is effecting a predetermined pulse count through the gate 17, the roller 13 makes a half rotation and stops, thereby pulling out substantially one half of a sheet from the cassette and stopping the sheet. By this, the difference between the time from the copy start till image transfer and the time required for the movement of the sheet, which difference would occur where the drum is small, can be corrected.

Upon the output of this flip-flop $Q_4$, the count CLK of clock pulses is started by the counter $Q_{12}$ through the gate $G_{22}$. A predetermined number of pulses counted corresponds substantially to one full rotation of the drum, and the flip-flop $Q_5$ is set through the OR gate $G_{24}$ to put out signal FWCl, which moves the platen leftwardly. When the platen actuates the reed switch 30, the flip-flop $Q_5$ is reset through the gate $G_{19}$ to disengage the clutch FWCl while the flip-flop $Q_6$ is set to put out clutch signal BWCl, which moves the platen rightwardly. The image exposure lamp 3 is turned on and controlled in synchronism with the main motor $M_1$, and the quantity of light thereof is controlled in synchronism with the control of this BWCl so that the light is intense when BWCl is ON. The reset time of the flip-flop $Q_6$ for terminating the first slit exposure is determined by cassette switches 50 and 51.

That is, when the switches 50 and 51 are 1 and 0, respectively, sheets of size A4 are contained in the cassette and therefore, the exposure stroke is terminated at that width. That is, the preset number of the counter $Q_{14}$ which counts clock pulses and determines the reversing position is determined to n1 which is suited for A4. In case of size B4, the switches 50 and 51 are 0 and 1, respectively, and therefore, n2 greater than n1 is preset. In case of size A3, the switches 50 and 51 are 1 and 1 and therefore, n3 which is greater than n2 is set. When the switches 50 and 51 are 0 and 0, cassette absence signal CEP is put out through the gate $Q_5$.

The counter $Q_{14}$ effects pulse count after the register switch 32 has been closed and, when the count reaches the aforementioned number n1–n3, the counter puts out BP to reset $Q_6$ and terminate the forward movement. On the other hand, $Q_5$ is set by BP through the gate $G_{24}$ to move the platen leftwardly and, when the platen actuates the reed switch 35, $Q_5$ is reset to stop the backward movement.

Now, when the switch 31 is closed in the course of the forward movement of the platen, signal PF is applied to the gates $G_1$, $G_2$ and counter $Q_{11}$ through the gates $G_{15}$, $G_{16}$ and $G_{17}$. Since the gate $G_1$ is OFF as aforementioned, $Q_2$ is not set, but by the opening of the gate $G_2$, the paper feed flip-flop $Q_4$ is again set and the roller 13 is further rotated to further pull out the previously pulled out sheet. Then, the leading end of the sheet strikes against the register roller 17 to thereby from a loop (slack) in the sheet. Thus, the sheet can be stopped by the register rollers with an appropriate amount of loop maintained in the sheet, thus eliminating the necessity of intricately taking into account the interval between the paper feed roller and the register rollers and also eliminating the necessity of providing any special means in the path, which contributes to compactness of the machine. Also, the loop can be made appropriate and constant and this can reduce jam of sheets as well as ensure stable and accurate registration between the drum image and the sheet to be accomplished by the register rollers 17. Such contrivance is also made in the case of manual supply (as will later be described).

Thereafter, by the closing of the register switch 32, the flip-flop $Q_3$ is energized to operate the rollers 17. The rollers 17 continue to rotate until the start switch 30 is closed next time.

In the case of a preset number of multi-copies, the gate $G_{10}$ is not opened even when one cycle of the process has been terminated and therefore, $Q_3$ is not reset even when the stop switch 35 is closed and accordingly, the backward movement is continued until $Q_5$ is reset by closing of the start switch 30, whereupon the backward movement is stopped. At the same time, $Q_6$ is again set to start the second forward movement exposure. The gate $G_{10}$ is open by an END signal provided by each of the signal STB from the stop key 41, paper absence and cassette absence signals PEP and CEP and a signal CTU indicative of a preset number of copies having been completed. Accordingly, the gate $G_{10}$ controls the outputting of signal HP so that scanning is repeated until a preset number of copy cycles is completed and until an interruption instruction is put out from the stop key or due to paper absence. Also, $Q_4$ is set by signal HP through the gates $G_4$, $G_{25}$, $G_{16}$ and $G_2$ to feed the second and subsequent sheets. Where only one copy is desired, CTU is being put out and therefore, $Q_4$ is not set even if this signal HP is detected. Also, even when the platen starts to move upon depression of the copy button and actuates the switch 35, $Q_4$ is likewise not set.

(Manual Supply Mode)

The manual supply mode will not be described in detail. The operator places a sheet on the bed 12 and urges it toward the rollers 14. First, the detector 15 judges whether or not the sheet has been appropriately inserted. When signal $PS_1$ is generated, timer $Q_9$ is energized to start $T_1$ time limiting operation. Before this $T_1$, the direction of the sheet is corrected and the sheet is caused to strike against the stopped rollers 14 so that the sheet is substantially at a right angle to the rollers 14. That is, for some time after the sheet has been inserted, the attitude of the sheet can be corrected to prevent jam thereof which would otherwise occur due to oblique movement of the sheet after it is fed.

When the time $T_1$ has elapsed, the flip-flop $Q_2$ is set through the gates $G_{15}$ and $G_1$. Also, the flip-flop $Q_1$ is set through the gate $G_{27}$. The manual supply input to $G_3$ is 1, since the flip-flop $Q_8$ is set by the switch 15. Also, since the gate $G_2$ is inhibited through an inverter, the driving of the cassette roller 13 is prevented even if signal PF is generated. The drum is rotated by $Q_1$ and the manual supply rollers 14 are rotated by $Q_2$ to introduce the sheet into the apparatus. The sheet arrives at the detector 16 provided behind the rollers 14. Then, the detector generates signal $PS_2$ and the counter $Q_{10}$ starts counting. When the time set by the timer $T_2$ has elapsed and the count is up, $Q_2$ is reset through the gate $G_{23}$ to stop the rollers 14, which thus wait for the next paper feed step. This corresponds to the preparatory paper feed from the cassette in the cassette mode, wherein the preparatory paper feed takes place as aforementioned when the detector 15 detects a manually supplied sheet irrespective of the forward or backward movement of the platen 1.

Also, upon operation of the rollers 14, the prerotation counter $Q_{12}$ is started through the gate $G_{22}$ and after a predetermined rotation, the flip-flop $Q_5$ is set to move the platen leftwardly in the same manner as in the case of the cassette mode and, when the platen strikes against the start switch 30, the forward movement for exposure is started.

Thus, in the manual supply mode, a copy cycle can be entered without closing the copy switch 40, thereby facilitating the operation.

When the switch 31 is closed during the forward movement for exposure, $Q_2$ is again set through the gates $G_{15}$ and $G_1$ to drive the rollers 14, which thus feeds the sheet to cause it to strike against the register rollers. When the next switch 32 is closed, $Q_3$ is set in the same manner as in the case of the cassette mode, to rotate the register rollers 17, which thus feed the sheet to the image transfer station.

When the sheet leaves the detector 16, $Q_2$ is reset through an inverter and gate $G_{23}$ to stop the manual supply roller 14 from rotating. This is for the preparation for the feeding of the next sheet.

In the case of the manual supply mode, copying can be started or re-started even if there are generated paper absence, toner absence and overflow signals. In the manual supply mode, several sheets of copies at most are to be produced continuously and thus, even if 1 of TEP and OVF is generated, it will not adversely affect the image or the apparatus. Consequently, this technique sets a value on the simplicity of operation. However, it is possible to effect such a control that when TEP and OVF are 1, start of the copying (the first sheet) is permitted but the subsequent re-start is prevented or the copying is quite impossible from the first.

Even if the sheet is momentarily spaced apart from the detector 15 during the time $T_1$ set by the timer $Q_9$, the timer operation can continue and thereby prevent oblique movement of the sheet to the utmost.

The detectors 15 and 16 are disposed so as to be concerned with separation of sheets and can therefore serve also to position the sheets, and even small sheets such as postcards or the like can be copied at an appropriate position.

Detailed description will now be made of the control of the reversing of the platen in the case of manual supply. In FIG. 7A, the signal $PS_2$ of the sheet detector 16 and a predetermined count number signal x from the counter $Q_{14}$ are applied to the input of $G_6$. This is for selecting one of the preset numbers n1 and n3 of the counter $Q_{14}$. That is, the counter $Q_{14}$ judges the size of a sheet as the large size (full) such as A3 or B4 when a sheet is present at the rear counter 16 for a predetermined number of pulses after the count has been started from the registration signal RG, and judges the size of a sheet as the small size (half) such as A4 when a sheet is not present, thereby bisecting the scan stroke. That is, when x is 1 and if 1 is applied to the gate $G_6$ through 0 of PS2, namely, through an inverter, n1 is preset in $Q_{14}$. If the detector 16 is still detecting a sheet when x is 1, 0 is applied to $G_6$ and n3 is preset through an inverter and gate. Accordingly, in the case of manual supply, the counter continues counting till $n_3$ or $n_1$ after x in accordance with the full-size or the half-size, thus putting out a reversing signal BP. Also, if manual supply again takes place during the backward movement, the output of the inverter INV2 will become 0 and so, $G_{10}$ will stop putting out its output and consequently, the switch 35 will not stop the platen but the cycle will continue.

What is important here is that since the sheet has already been fed to the register rollers 17, the timing signal x which senses the sheet detector 16 is a pulse number smaller than $n_1$ of $A_4$ size and also is a timing generated before completion of the stroke corresponding to $A_4$ size.

In this manner, the size data of manually supplied sheets can be sequentially judged at the interval between the process sequence controls without such data being applied in advance in any manner and this can contribute to the sequence control and simplify the circuit arrangement.

In the case of the cassette mode or in the case of the continuous multicopy operation, it is desired to increase the speed to the utmost and to set strokes corresponding to various copy sizes and therefore, three different presets are effected as shown, whereas in the case of the manual supply mode, the desired number of copies is several sheets at most and therefore, two different stroke modes suffice. In this manner, the control mode in the case of the manual supply is simplified as much as possible to reduce the trouble to the utmost.

Description will now be made of the copy interruption instruction in the cassette mode. Re-start by the copy key is prevented by PEP, TEP, CEP and OVF. Before completion of the multicopy operation, the gate $G_{18}$ puts out a signal END by stop key STB signal and PEP and LEP signals to inhibit the gate $G_{14}$ and prevent the subsequent preparatory operation of the paper feed roller 13. Accordingly, the multicopy operation is interrupted. In the case of the stop key, copying is re-started with the copy key ON. By TEP and OVF, the multicopy operation is not interrupted but is completed.

It is also possible to divide the sense timing of the detector 16 in the manual supply mode into $x_l \ldots x_n$ and effect the sense to thereby effect various stroke controls and it is also possible to set a preset number different from that in the cassette mode in $Q_{14}$.

When a sheet from the cassette or a manually supplied sheet has jammed, jam signal JAM is applied to the R ports of $Q_1$–$Q_6$ and $Q_8$ to deenergize all the clutches and the main motor without waiting for the completion of the process.

The flip-flop $Q_8$ for setting the manual supply mode is reset by the reversing signal BP or the jam signal JAM. Also, during the time that the platen moves backwardly after completion of the exposure, manual supply or sheet pick-up from the cassette by the copy key 40 can be effected to enable quick re-start of the copying. By causing the timer $Q_9$ to be started by the AND of the inverter toner absence signal from $G_{21}$ and the detection signal $PS_1$, the manual supply copying can be prevented when OVF and TEP are 1.

As described above, when the manual supply copying is started, the setting of $Q_4$ which drives the cassette roller 13 is inhibited by the set output of $Q_8$, so that the cassette mode is not entered even if the copy key 40 is depressed. However, when the manual supply mode exposure is terminated, $Q_8$ is reset by BP signal and thus, the inhibition of $Q_4$ is released. Accordingly, sheet pick-up from the cassette can be effected by the copy key 40 before the platen comes to its rest position. Consequently, mode change-over can be achieved a little early.

Also, when a manually supplied sheet is inserted while copying is being repeatedly executed in the cassette mode, the setting of $Q_4$ is inhibited and $Q_2$ is set, so that the cassette mode copying is interrupted and the manual supply copying is carried out preferentially. If the copy key 40 is again depressed after termination of the manual supply copying, the remaining number of copies will be completed.

During the time that copying is being repeated in the cassette mode, it is also possible to inhibit manual supply until the BP signal for the last copy is generated and this can be accomplished by applying another $\overline{CTU}$ signal to the gate $G_2$.

Figure 10:
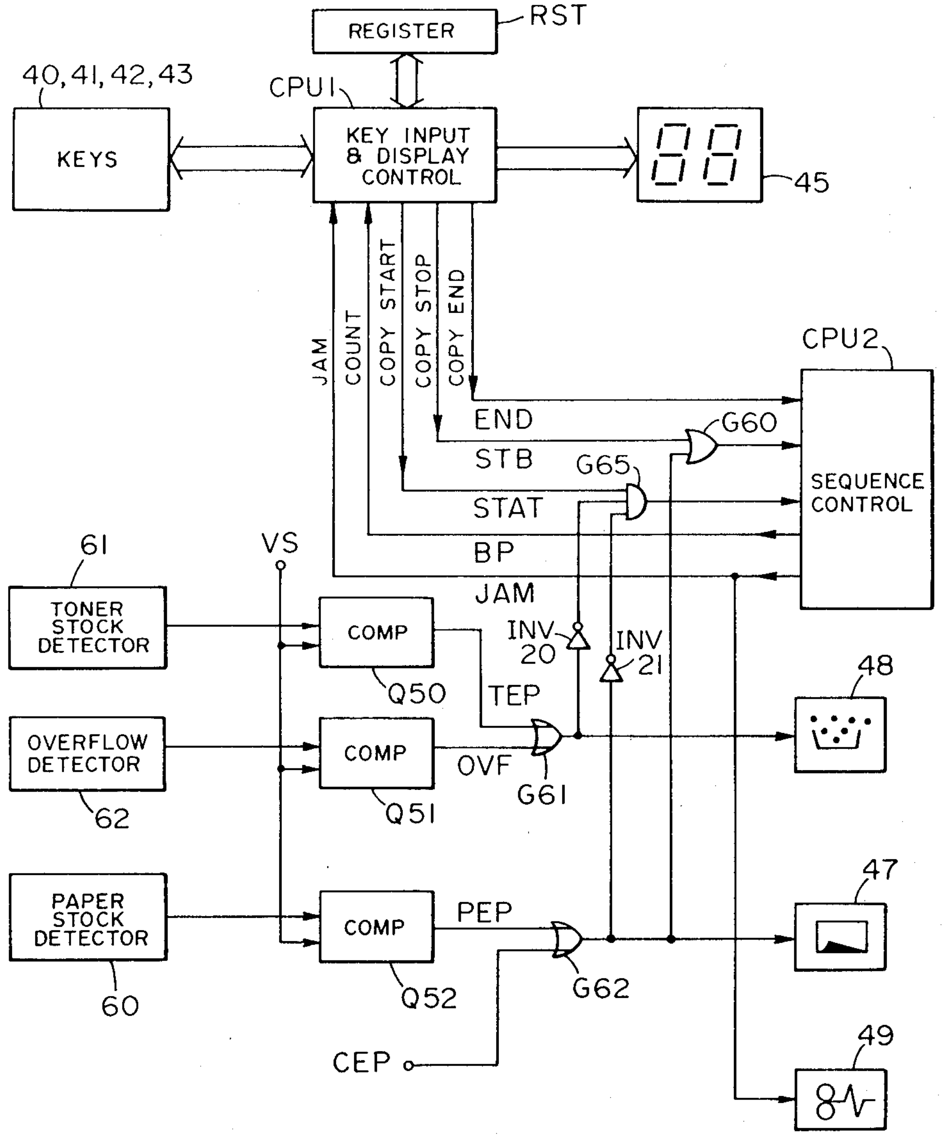
FIGS. 10 and 11 show examples of the indication control circuit illustrated in FIG. 1.

FIG. 10 shows an example of the circuit for displaying toner absence and overflow. Designated by $Q_{50}$–$Q_{52}$ are operational amplifiers for detecting toner absence, overflow and paper absence, respectively. These operational amplifiers put out their outputs by comparing their detection results with a standard voltage $V_s$. An element 61 judges the toner level in the developer container from the presence or absence of toner intervening between a lamp and a light-receiving member (CdS), and puts out TEP when the quantity of light received exceeds a predetermined level. An element 62 uses a lamp and a light-receiving member and detects toner in the same manner as the element 61 and puts out OVF when the quantity of light received is below the predetermined level. An element 60 puts out PEP in the same manner as the element 61 when the quantity of light received exceeds the predetermined level. $G_{60}$–$G_{62}$ designate OR gates, $G_{65}$ denotes an AND gate, and INV 20–21 designate inverters. $CPU_1$ controls the start, stop and movement of a control unit $CPU_2$ which applies the signals of the ten key, stop key, copy key and clear key of the operating portion, effects the display operation of the displayer 45, causes the copy present number by the ten key to be stored in a register RST (memory) and controls the process sequence.

Operation will now be described. When the toner in the developing device becomes decreased during the copying, signal TEP is put out from the operational amplifier $Q_{50}$. That signal is applied through the gate $G_{61}$ to the toner absence displayer 48, which is thus turned on to give a warning. At the same time, that signal OFF-controls the gate $G_{65}$ through an inverter. Accordingly, even if an attempt is made to re-start the copying by depressing the copy key after the termination of the copying, the copying cannot be re-started because STAT signal if OFF. However, the stop signal STB is not being controlled by TEP so that the preset number of copies set by the ten key can all be completed even if the lamp 48 is turned on in the course of the copying.

When the toner in the toner collecting container 7 is increased approximately to an overflow condition, signal OVF is put out and like TEP, it controls the starting gate $G_{65}$ through the gate $G_{61}$. At the same time, this is displayed by a displayer which is originally adapted to display toner absence. In this case, the displayer may be caused to effect a display different from TEP which effects turn-on-and-off display. Again in the case of OVF, STB is not controlled but the preset number of copies are completed. The completion of the preset number of copies is accomplished by counting the signal BP (the reversed position of the platen) for each copy cycle by the preset number stored in the register RST and putting out the signal END. The copy interruption is such that by the stop key ON and jam, signal STB is put out and one process cycle during the stop key ON is terminated, where after the continuation of the next cycle is prevented, and not all of the preset cycle is executed.

Such prevention is effected during cassette absence or paper absence. That is, by the paper absence signal PEP and cassette absence signal CEP, signal STB is put out to $CPU_2$ through the gates $G_{62}$ and $G_{60}$. Thereby, a treatment similar to that in case of the stop key ON is carried out. Also, PEP and CEP cause the same displayer 47 to display that effect. Alternatively, the display contents may be distinguished from each other by causing one to be turned on and off at a predetermined period and causing the other to be statically turned on.

When sheet jam has been detected, signal JAM is put out to turn on or turn on and off the displayer 29. At the same time, the power sources for dangerous load (high voltage, heater, etc.) are switched off. That is, the process cycle is interrupted in the course thereof so that copying for the preset cycle as well as for one cycle may not take place. However, the power source of CPU and RST can be held so that the preset number is not cancelled even if the main switch 39 is opened. In the case of such jam, the next process re-start can be accomplished by manually closing a switch which releases the jam and cannot be accomplished simply by depressing the copy key.

In addition, it is possible to put the end signal and the output of sensor 61 or 62 into an and-gate, and put the output thereof into one of the operation amplifiers $Q_{50}$ and $Q_{51}$. By doing so, the toner absence and the overflow can be detected only after the termination of the preset number of copies, and then it is displayed and the resuming operation is stopped.

In this case, the lamp of sensor 61 or 62 can be controlled by the end signal. Additionally, by controlling the WAIT signal with END signal, the display and the resuming operation can be controlled. The method explained in this paragraph is very effective when the sequence, display and resuming operations are all controlled by a computer (e.g. when the circuits of FIG. 10 are all embodied by a computer).

Figure 11:
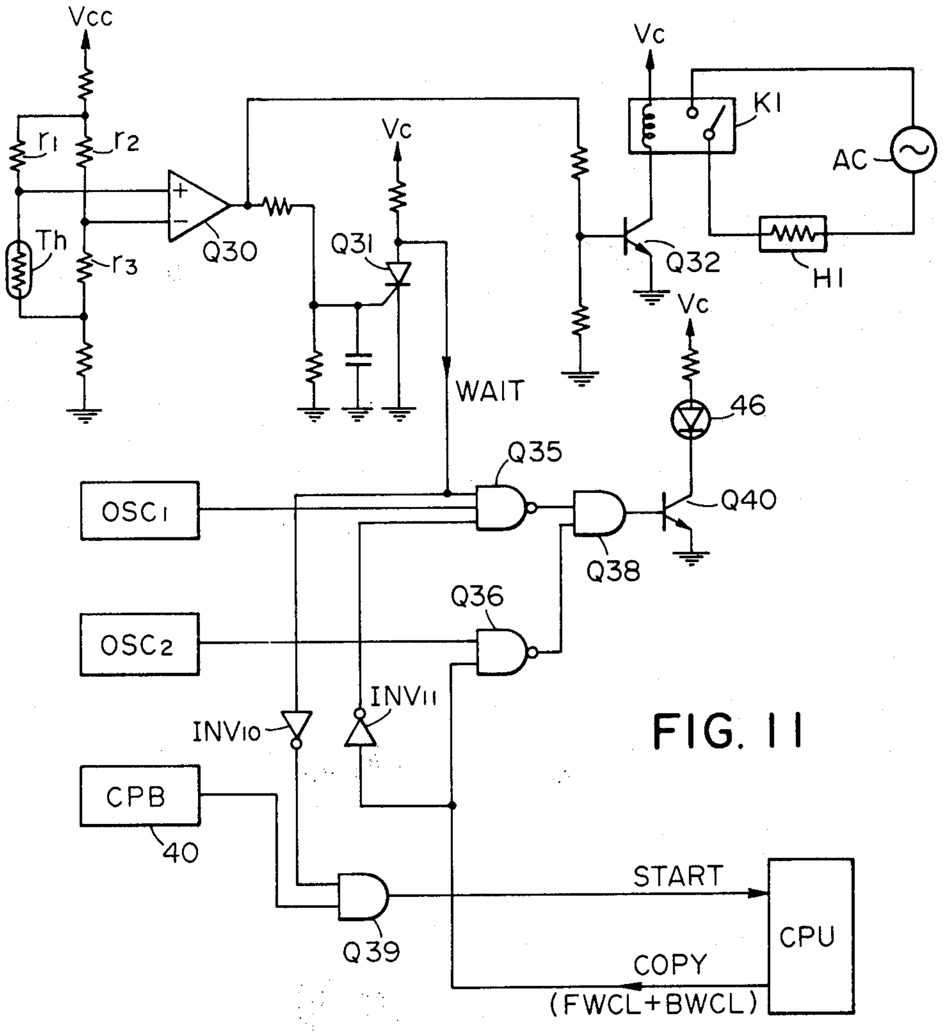

FIG. 11 is a diagram of an example of the circuit which puts out the wait signal WAIT. In FIG. 11, $r_1$–$r_3$ designate resistors which, with a thermistor Th, constitute a temperature detecting bridge. Q30 designates an operational amplifier which puts out O when the temperature of the thermistor Th is below a predetermined temperature and puts out 1 when the temperature of the thermistor Th is above the predetermined temperature, namely, the fixing temperature. Q31 is a thyristor electrically energized by the output 1 of the operational amplifier. Q32 denotes a transistor adapted to be turned on by the output 1 of the operational amplifier to drive a relay K1 for electrically energizing a heater H. AC is an interchangeable power source, and Q35 and Q36 are NAND gates. Q38 designates an AND gate for operatively controlling the wait display lamp 46. Q39 denotes an AND gate which puts out a signal STAT for starting the copy process. INV10 and 11 are intervers. Q40 is a transistor for turning on the wait lamp 46. CPU is a copy sequence controller. COPY is a signal indicative of the copying cycle being executed and the time chart thereof is apparent in FIG. 4. OSC1 and OSC2 designate oscillators of different oscillation frequencies which become operative upon closing of the main switch.

Figure 12:
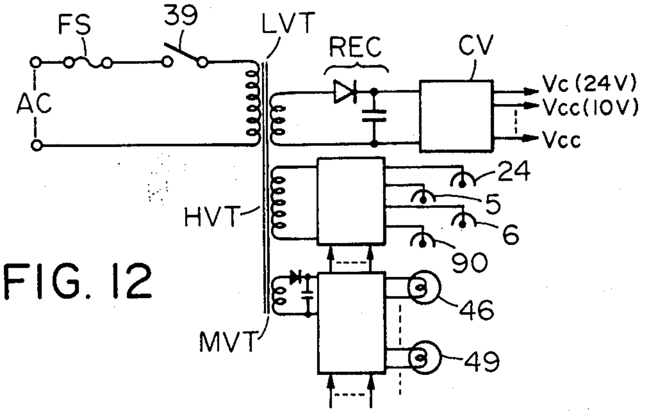
FIG. 12 is a schematic power circuit diagram.

FIG. 12 diagrammatically shows an example of the power source circuit. It includes a fuse FS, a low voltage transformer LVT for obtaining controlling source voltages Vc and Vcc, a high voltage transformer HVT for operating the corona charger, a transformer MVT for operating a medium load such as a halogen lamp, a circuit CV for stabilizing the outputs Vc and Vcc, and a rectifier REC.

Operation will now be described. When the main switch 39 is closed, DC voltages Vc and Vcc are put out to render the circuits of FIGS. 7, 11, etc., operative. When the temperature of the fixing roller is so low that copying is impossible, the operational amplifier puts out 0 due to the high resistance of the thermistor Th and the thyristor Q31 maintains its OFF condition and accordingly, the wait signal WAIT is put out by the voltage Vc. On the other hand, the transistor Q32 energizes the relay K1 to heat the heater H1. Consequently, even if the copy key 40 is depressed, sheet feeding and scanning would be prevented from starting by the gate Q39, However, the gate Q35 is receiving as input the signal from the oscillator OSC1 and the copy signal COPY is applying 0 signal and therefore, a signal synchronized with OSC1 is put out to the gate Q38. Since a signal 1 provided by the 0 signal of COPY is being applied to the other input of the gate Q38, the transistor Q40 is turned on and off in synchronism with OSC1 and accordingly, the wait display lamp 46 is turned on and off in synchronism with the period of OSC1. This provides to the operator a warning that the copying is impossible. When the thermistor Th reaches the fixing temperature, the thyristor Q31 is energized by the output of the operational amplifier Q30 and thus, the signal WAIT becomes 0. On the other hand, the relay K1 is deenergized to stop the power supply to the heater H. The output of the gate Q35 becomes 1 and accordingly, by the signal 1 of the gate Q38, the transistor Q40 is statically turned on to turn on the lamp 46. Since one input of the gate Q37 becomes 1, the reception of the copy key is rendered possible and thus, the apparatus waits in the so-called standly condition. In this case, even if the ON-OFF-control of the heater H is effected to maintain the fixing atmosphere at the fixing temperature, the signal WAIT remains to be 0 due to the power supply holding action of the thyristor and therefore, no display malfunctioning occurs.

When the main switch 39 is closed during this standby, the voltages Vc and Vcc become OFF and therefore, in spite of the aforementioned holding action of the thyristor, the power supply to the wait display lamp 46 is cut off to turn off this lamp. Thus, this lamp 46 enables the operator also to judge the power supply condition to the apparatus.

When the main switch 39 is again closed, the thyristor is immediately energized through the operational amplifier because the fixing roller, namely, the thermistor Th is not cold, and as aforementioned, the lamp 46 is statically turned on to bring the machine into standby condition.

When the copy key 40 is depressed during this standby, start signal is put out to CPU to start the operations of the main motor, paper feeding and scanning. CPU puts out copy signal COPY and therefore, the output of the gate Q35 is completely rendered to 1 and a series of pulses of the oscillator OSC2 are put out from the gate Q36. Accordingly, the gate Q38 turns on and off the transistor Q40 in synchronism with OSC2 and consequently, the transistor can turn on and off the lamp 46 at a repetition period longer than that of OSC1. When the scans for a preset number of copies have been terminated and the platen arrives at its reversing position, the signal COPY becomes 0 and therefore, the standby condition is again brought about with the lamp 46 being statically turned on, and thus, the platen becomes ready to receive copy re-start instruction.

When the copy key is depressed at this time, the same operation as for the previous preset number of copies is restarted without the number of copies being re-set. This re-start is effected in the same manner as the continuous copying wherein even when the platen is returned to its stop position, it is not stopped but is caused to continue to scan.

If the main switch 39 is opened without the copying being re-started, the lap 46 will be turned off to display that the voltage to the loads such as clutch, main motor, corona charger, etc. has been cut off.

It is also possible that after the main switch 39 has been opened, the amount of power supplied to the lamp 46 is decreased to display the OFF condition thereof. This will be effective for the case where the central control unit CPU remains alive even if the switch 39 is opened, namely, the case where it is desired to continue the memory's operating condition. Particularly, when jam of a sheet is to be dealt with, it is often the case that the main switch 39 is opened and in such case, it is not preferable to cancel the preset number stored in the memory and thus, using said display as the display of the memory ON condition would be very convenient.

Now, in the time chart of FIG. 4, if, on the first sheet, the disconnection of thermistor 204 or overflow of cleaning toner or no toner, no cassette or no paper is detected, solid lines appear and if the conditions are normal, dotted lines appear. When the disconnection of the thermistor is detected, the signal WAIT is outputted.

The fixing means consists of the upper roller 202 and the lower roller 201 and a halogen heater 203 is inserted as a heat source in the upper roller, a temperature sensing element 204 is provided adjacent to the upper roller 202 for detection of upper roller surface temperature and the temperature control of the fixing means 20 is effected on the basis of signals from the temperature sensing element 204 in such manner as to maintain constant the upper roller surface temperature by switching on and off the halogen heater 203.

(First prerotation control)

Next, the aforesaid first prerotation control will be described in detail.

In FIG. 7B, the input signal S1 is a signal which changes from the status 0 to 1 in time $T_1$ after turning on the power switch 39 (hereinafter called "power ON signal"), while the input signal S2 is a signal which changes from the status 0 to 1 in time $T_2$ after turning on the power switch 39 in case the aforementioned copying conditions are not ready (with $T_1<T_2$), which returns to 0 at the time when copying conditions are available (hereinafter called "wait status signal").

At Q202, power is applied between the terminals V+ and V− by the timer IC and if a signal trailing from 1 to 0 is inputted as a trigger signal to the trigger input terminal TR, it outputs 1 from the output terminal Q for the time corresponding the time constant to be determined by the resistor R 201 and the condenser C201 connected to the time constant terminal TC. In this case, however, if 0 signal is inputted to the reset terminal R, the signal 1 rises at the terminal Q even before time-up. The signal S3 to be outputted from the output terminal Q is the one to be inputted to other circuit (not shown) so as to execute the first prerotation in the status 1, which will hereinafter be called "first prerotation control signal ROT 1".

Here the wait signal S2 remains in the status 1 (WAIT) until the fixing means 20 reaches the required sensitivity by the signal from the temperature sensing element 204 in the fixing means in FIG. 1. Here a signal during heater wait will be taken as an example, but it may be a developing solution concentration recovery signal or a signal during the time in which drum surface potential is detected and 0 or uniform specified potential can be detected.

Figure 22:
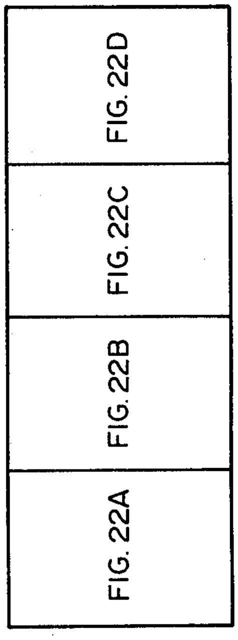

FIG. 8A represents a time chart in cases where the fixing roller temperature is relatively low at time of power switch ON. The WAIT signal S2 turns into 1 after time T2 (approx. 30 sec.) from power ON and, via the circuit comprising noise prevention resistor R202 and condenser C203, is inputted to the terminal R of Q202. Thereafter, after the lapse of time T1 (approx. 50 sec.) from power ON, the power on signal S1 is inputted via the inverter Q201 to the terminal TR of Q202 as a 1-to-0 trailing signal. Accordingly, at this time the signal ROT1 is outputted as 1 from the output terminal Q and starts rotation of the drum 2 (FIG. 22). If wait condition continues even after T3, the first prerotation is carried out and the sensitive body equalizing process (cleaning, removal, pre-exposure, etc.) effected for the time T3 (equivalent to ten odd rotations of the drum) to be determined by R201 and C201 and the drum stops at T3. The time T3 is set at approx. 30 sec. as the time in which the sensitive element (5 to 15 cm in diameter) can be equalized in the aforementioned processes even when the machine is shut-down for a considerably long time after power switch OFF so as to avoid excessive rotation and equalization.

FIG. 8B represents a time chart in cases where the fixing roller temperature is relatively high at the time of power ON. That is, it represents a case of relatively short-time shutdown after power switch OFF during pause of copying and stop of power supply to the heater 202.

In this case, various conditions on the drum surface do not vary much. For instance, the sensitivity of the sensitive element does not recover much, remaining nearly in the previous condition. In this case, sometimes the wait signal S2 becomes 0 in time T4 shorter than the time T3, resulting in the end of the waiting condition. Accordingly, the signal S3 turns to 0 simultaneously with the end of the wait condition, whereupon the drum stops and the first prerotation comes to an end.

On the other hand, if the first prerotation is required at least for the time T5 (equivalent to a little less than 2 revolutions of the drum), the drum is rotated for the time T5 even if the wait time is shorter than the time T5.

(Refer to FIG. 8C).

As above, according to this invention, by giving priority to the wait status end signal over the specified first prerotation time signal, it is possible, without providing a surplus waiting time, to effect the first prorotation process for a proper time and prolong it the longer the leaving time is.

Figure 15A:
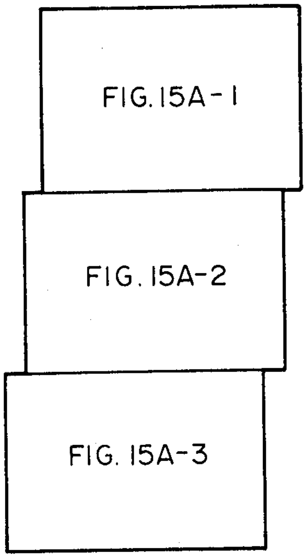

During the first prerotation, as in the time charts in FIGS. 4 and 22A–22D, the lamp 3 and the corona discharger 6, etc. are lit (weak) for equalization of surface potential. In FIGS. 22A–22D, ROT2 and ROT3 represents essential rotation corresponding to T5, with the latter effecting equalization by lowering the secondary charger output. For instance, by inputting S3 to CPU 2 as in FIGS. 15A-1 through 15A-3 and counting pulse CL, T5 drum rotation can be continued.

Further, in cases where an improvement of image quality can be expected the longer the first prerotation process is due to differences in apparatus configuration or type of sensitive element, being not limited to the present embodiments, copy image quality improvement can be achieved by carrying out the first prerotation process until availability of the copying conditions and as far as the power switch is on even if not only the temperature conditions of the fixing means, but also other conditions making copying impossible such as availability of transfer material and developer and various other impossible conditions were existing.

In the meantime, in cases where it is not advantageous to rotate the sensitive element in the condition where transfer paper is jammed at time of the power switch ON and so on, it is desirable to prohibit the first prerotation.

The circuit is illustrated in FIG. 7C. That is, the output S1 is controlled by the gate G100 to which the signal JAM is inputted. The signal JAM is outputted at time of switch ON if the interlock to be mentioned hereinafter is not released. Accordingly, S1 is interrupted during continuance of JAM condition and therefore the rotation time does not start. Similarly, the rotation is interrupted by the detection signal 63S if paper is remaining at the paper sensor 63 when the switch is on.

(Rotation at time of JAM)

FIG. 13 represents an example of the drum sensitive element processing control circuit at time of occurrence of jamming. In this figure, 401 is the sequence controller CPU2 to control operation of the copying apparatus in FIG. 1, controlling loads in accordance with the time chart shown in FIG. 4. Further, the output signal A of the sequence controller 401 is the operating signal IEXP for the main motor to drive the drum, etc. in FIG. 4 as well as for the exposure lamps, the signal B is the corona generating signal HVT 1 for predischarger, primary charger and transfer charger, the signal C is a signal HVT 2 to generate secondary corona simultaneously with exposure and the signal D is a signal JAM to be generated on detection of sheet JAM. On the other hand, 405 is a timer circuit for delay of operation when input changes from high level, with the operation being as in FIG. 6.

Further, as output D, the detection signal is outputted in the case of other troubles and the power switch cut-off detection signal is outputted in case the power switch 39 is turned off during revolution of the drum 2. In the latter case, as the power source for loads 402 and 404 as well as for CPU, a backup power source using condenser or battery is employed. Thereby, even if copy operation is interrupted due to detection of JAM or other troubles, the drum 2 is stopped after some revolution, during which time electric charges by the primary charger, etc. are eliminated.

In cases where jamming as in the description of operation does not arise, each output of the sequence controller 401 is generated according to the time sequence shown in FIG. 4 and the JAM output D is not outputted and therefore I/O of the inverter 406 is 1 and the output of the timer 405 is 1, thus controlling the AND gates 402, 403 and 404 on, and consequently a normal copying is effected. On the other hand, output of the inverter 407 is 0 and accordingly no JAM indication takes place.

In cases where jam occurs during copying or the abovementioned halogen lamp is burnt out during copying, the signal JAM is set in the output D and JAM is indicated via the inverters 406 and 407 and at the same time, 0 is transmitted to the input of AND gate 403 and accordingly the operation of the primary and transfer chargers and predischarger is cut off. Further, since the input to the timer 405 is changed from 1 to 0, the timer 405 starts timer operation from such point of change and, after the lapse of a fixed time $T_{10}$, turns its output to 0. The signal is transmitted to the AND gate 402 and 404 and the exposure lamp, main motor and secondary corona charger are cut off. In the meantime, the backward clutch is actuated in such manner as to reset the platen forcibly to the stop position (switch 35) in the time $T_{10}$.

That is to say, in the case of occurrence of JAM, simultaneously with JAM indication, the primary and transfer chargers as well as predischarger are cut off and after the lapse of the fixed time $T_{10}$, the secondary corona, main motor and exposure lam; are cut off. By setting the time $T_{10}$ to a time nearly corresponding to a high-tension region between primary charger 5 and secondary charger 6 in FIG. 1, a high-potential region is eliminated under the effect of lamp light and secondary corona, thus eliminating the possibility of residual memory or the development of high-tension. Further, the distance between the primary charger 5 and the secondary charger 6 is not so large generally and therefore the time $T_{10}$ can be shortened, thus promoting the jamming condition rarely. On the other hand, the shutter 25 is switch-controlled simultaneously with occurrence of JAM so as to produce light paths as a and c in FIG. 20.

Further, in FIG. 1, the drum surface between the transfer charger 90 and the predischarger 24 at somewhat high potential and it is possible to set the aforesaid timer $T_{10}$ in such manner as to evenly discharge the said potential to allow it to approach zero. In respect of the abovementioned and what is described below, the same applies to jam, lamp burn-out and intermediate switch off, too, but the main motor can be run to discharge paper except in the case of jam.

Further, in such type of copying apparatus in which the fixing rollers 201, 202 (rotated by the main motor) are pressed during copying in utilizing its turning force and such pressure is relieved after copying, it is also possible to set the said timer time T to the time required for release of pressure. It is thereby possible to prevent the rollers from being left under pressure at time of jamming and deformed.

On the other hand, similar to post-rotation after the end of a preset number of copies after jam (called "cycle-out post-rotation"), for the purpose of reducing the effect of the secondary charger 6 and/or lamp light by jam output D, it is also possible to lower impressed voltage to them and thereby allow drum surface to further approach zero. That is, as in FIGS. 21A and 21B, the drum is stopped after about half revolution. Further, in case the time of the abovementioned cycle-out post-rotation $T_{20}$ (ROT 1+ROT 2+ROT 3) and the time of rotation after jam $T_{10}$ are different and in case they are equal as well, for the purpose of a further approach to zero potential and for removal of potential irregularities, it is also possible to operate the loads 402 to 404 at voltages corresponding to these times. In addition, $T_{20} > T_{10}$ is preferable.

On the other hand, during rotation after jam, the movement of the conveying belt 19 is stopped so as not to make jammed condition complicated. Further, it is possible to effect control in such manner that the abovementioned post-jam rotation is prohibited in the case of jam near the drum and it is permitted in the case of jam near the fixing rollers.

It is shown in FIG. 13B. If, at the time when there should be no paper, paper is detected at the paper detecting switch 16, JAM 2 is outputted, LED (not shown) is lit and all are stopped via OR gates 410, 411. If jam is detected at the outlet paper detection switch 63, JAM 1 is outputted for processing as described above.

(Acoustic display)

FIGS. 15A-1, 15A-2 and 15A-3 are key entry-indication-sequence control circuit diagrams. CPU 1 and 2 are one-chip semiconductor microcomputer each. In CPU 1, for judgement of the status of start key 40, stop key 41 and ten key 42, time-divided repeat pulses are outputted from output ports KS1–KS4. Each key constitutes a matrix configuration comprising its scan line and input line to K1–K4 and dynamically inputs key status into CPU 1 memory. On input of copy start key 40, stop key 41, ten key 42 and clear key 43, CPU 1 operates the 7-segment LED indicator 45 for indication, stores the preset number of copies by ten key 42 in the register RST (memory RAM) of CPU 1 and controls start, stop and movement of the control unit CPU 2 for control of process sequence. The LED indicator 45 is segment-selected by conversion of coded DISP signals A–D and position-selected for dynamic display.

Further, on input of various keys mentioned above, CPU 1 drives the key confirmation speaker 50 for a short time (milli-second) to inform the operator of key input through emission of sound. At this time the control unit CPU 1 judges from the signal BP from CPU 2 as to whether copying is in progress and prevents input of ten key 42 into memory during copying. Further, it receives jam signal JAM from the control unit CPU 2, at which time it prohibits input of ten key 42, copy start key 40, stop key 41 and clear key 43 into memory. On the other hand, in the case of no input into memory, the key confirmation speaker 50 does not emit sound even if key is pressed on. In the meantime, when key operation can be started if the start key 40 is pressed, it is possible to emit tone from the speaker 50, which is different from the one emitted when other keys are pressed.

The sequence control unit CPU 2 receives copy start enabling signal STB, copy start command signal STAT and copy end command signal END from the control unit CPU 1 and further, receives the aforesaid clock pulse CL generated by revolution of the drum 2 to be driven by the main motor M1 from the drum clock generating unit DCK, the specified number of which is counted in the computer CPU 2 for control of each load according to the time charts shown in FIGS. 4 and 22A through 22D.

Figure 14:
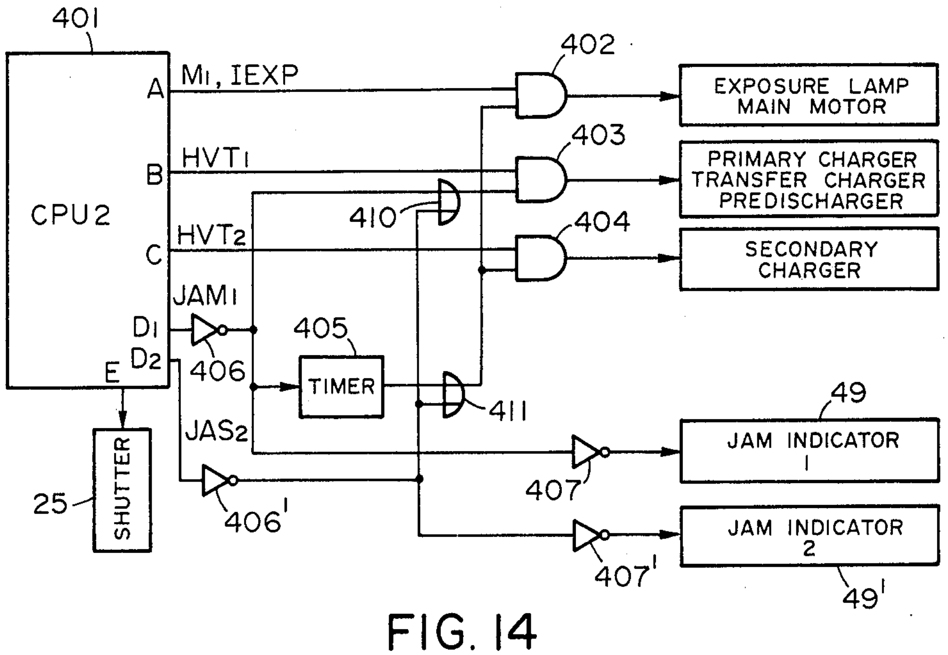

As above, drum clock pulse CL is a signal important for sequence control and if clock pulse is not generated due to failure of the main motor, trouble in the drive system, mechanical or electrical failure of the drum clock pulse generating unit DCK and so on, the halogen lamp is on continuously, causing a critical trouble to the copying apparatus. For this reason, when counting the clock pulses, the sequence control unit CPU 2 utilizes a built-in timer and if clock pulses are not inputted during a fixed time, outputs a clock pulse trouble signal to the line 110 (BZ). It outputs the signal from the ports D, D1 in FIGS. 13 and 14 and interrupts the sequence.

Figure 16:
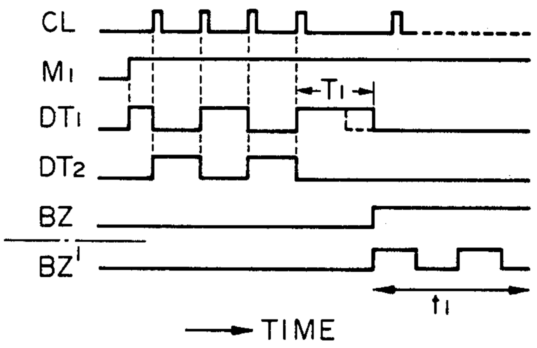
FIG. 16 is a buzzer action time chart.

The operation time chart is shown in FIG. 16. That is, it drives the first timer DT 1 by the motor drive signal $M_1$, resets DT 1 if pulse is generated before time-up of $T_1$ and drives the second timer DT 2, resets DT 2 if the next pulse if generated before time-up of $T_1$ of DT 2, taking it as normal, and if pulse CL is not detected before time-up of DT 1 and DT 2, outputs BZ signal. Accordingly, the motor and all pulses can be checked up. In this way, a warning of trouble is given by causing the aforesaid speaker to emit sound continuously or intermittently (as BZ') (repeated for several seconds). Further, all sequences shown in FIG. 4 are interrupted immediately so as to prevent a grave accident of the copying apparatus before it happens. In addition, in such case, too, the alarm is made conspicuous by operating the speaker 50 with tone different from the one at the time of key input (in providing a different acoustic frequency).

On the other hand, the circuit DCK detects holes of a number of perforated discs provided in the drum shaft as photo changes by means of a photo interrupter comprising $L_1$ and $R_1$ and drives the transistor TR 1 to output CL.

As above, by a common use of the key confirmation speaker (buzzer) 50, an alarm of trouble such as main motor stop, etc. can be given.

Moreover, abnormal lighting of lamp, abnormal lighting of heater, disconnection of thermistor 24 and sheet jamming, etc. are detected and an alarm can be given in using the abovementioned buzzer.

Figure 15B:
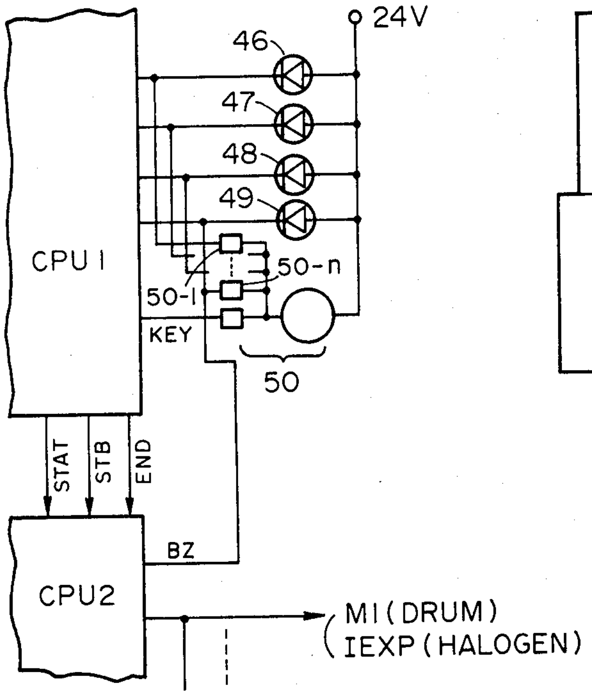
FIGS. 15B and 15C are schematic circuit diagrams showing other examples.

In addition, by changing the sound emission period of the speaker (buzzer) according to various abnormal conditions such as jamming, failure in forward and backward clutches, troubles in various drive amplifiers, no paper within the cassette and no toner in the developing unit, etc., alarm and identification of various conditions can be performed by means of a single member. This is made possible, as in FIG. 15B, by selecting, according to various detecting signals such as JAM detection 49, etc., one of the output ports $n_1 \ldots n_n$ of CPU 1 and operating one of the oscillators 50-1 to 50-n different in frequency.

In addition, depending on the abovementioned abnormal conditions, the operator's attention may be called by expressing the condition in question in voice statement (message). In this case, a small speaker is used rather than a buzzer. As a thin type, a piezo-electric speaker is preferrable to the M-M and M-C types. By storing the voice statement information as codes beforehand in the memory for exclusive use for read-out of CPU (program memory ROM for sequence or separately provided read-out memory ROM), reading the information by a trouble detection signal and converting it, under a known system, into voice and outputting it to the speaker via an audio amplifier, the audio representation can be achieved and, as mentioned previously, the speaker can also be used for key sound emission.

Further, by storing the aforesaid message to inform wait-up and a message to inform proceeding to the post-rotation mode as aforesaid in ROM as audio informations, it is possible to read out each message according to the signals WAIT and CTU and cause the said speaker to emit sound.

Figure 15C:
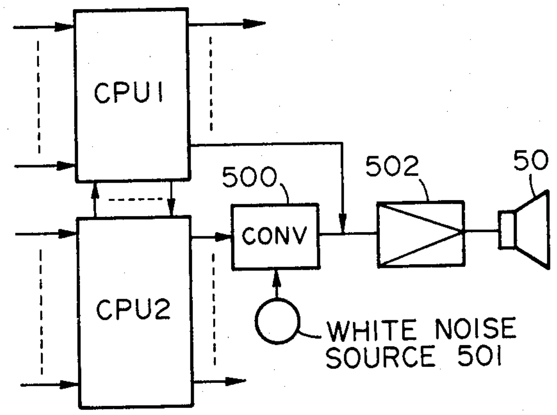
Figures 1, 15A:
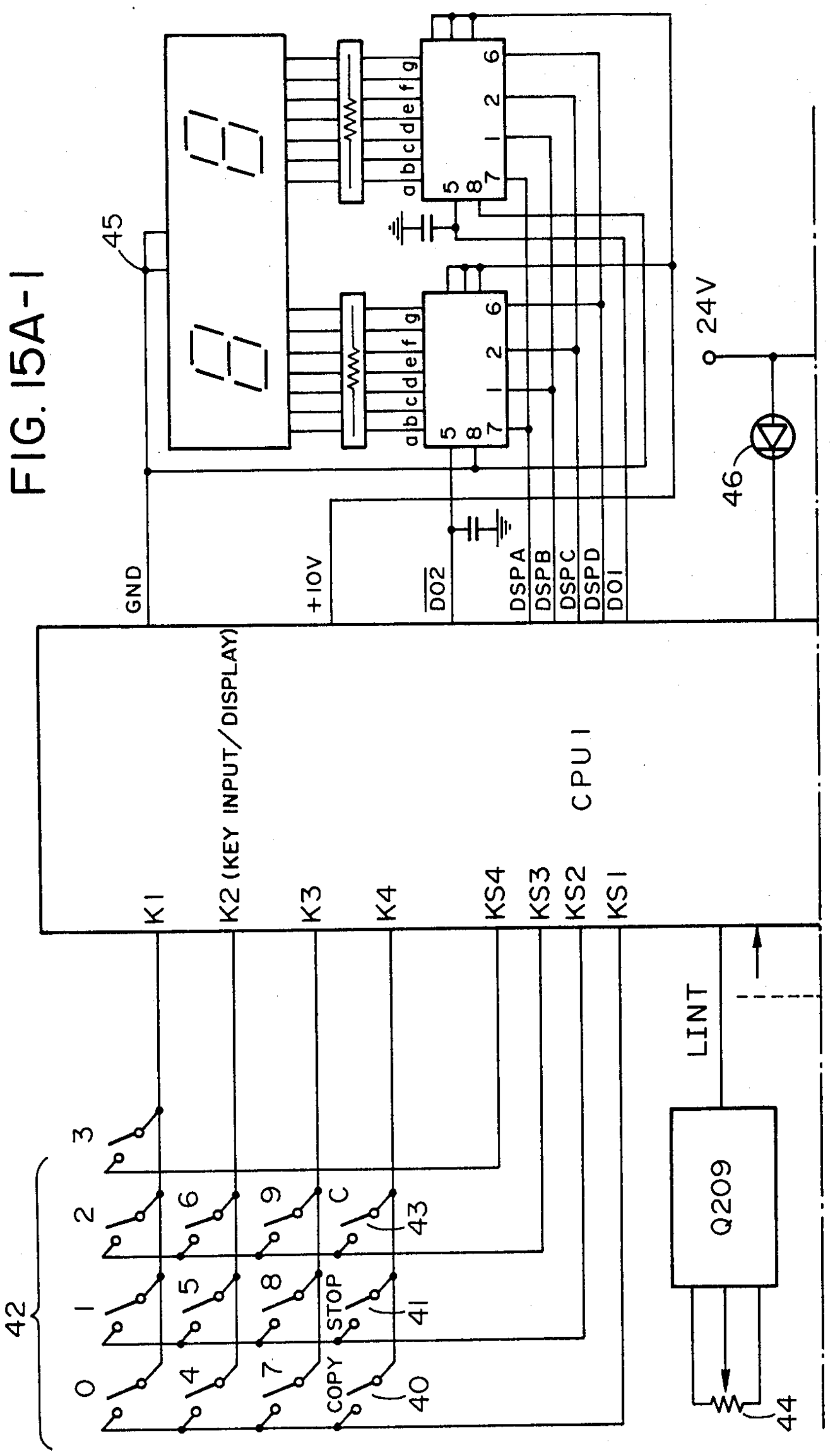
Figures 2, 15A:
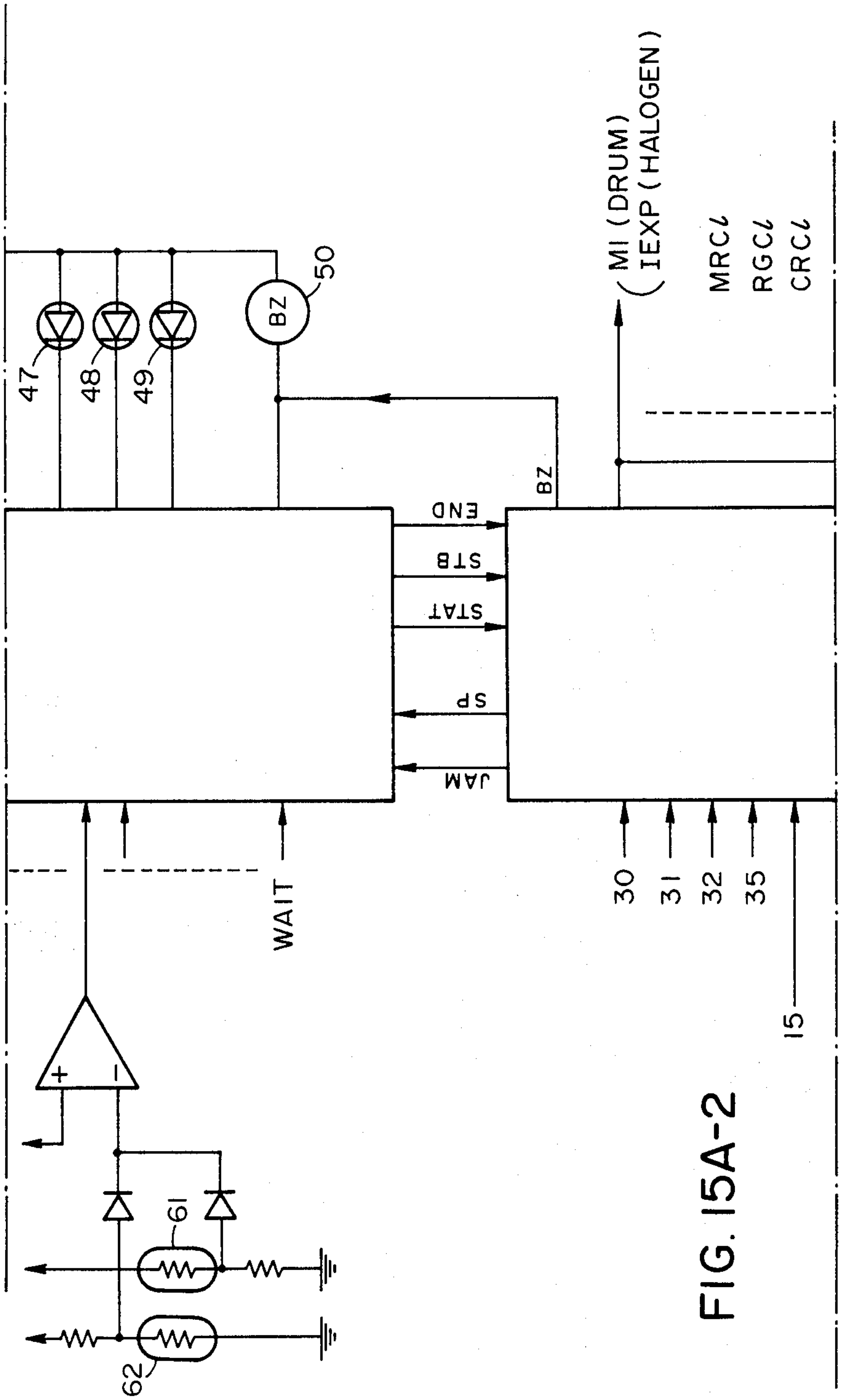
Figures 3, 15A:
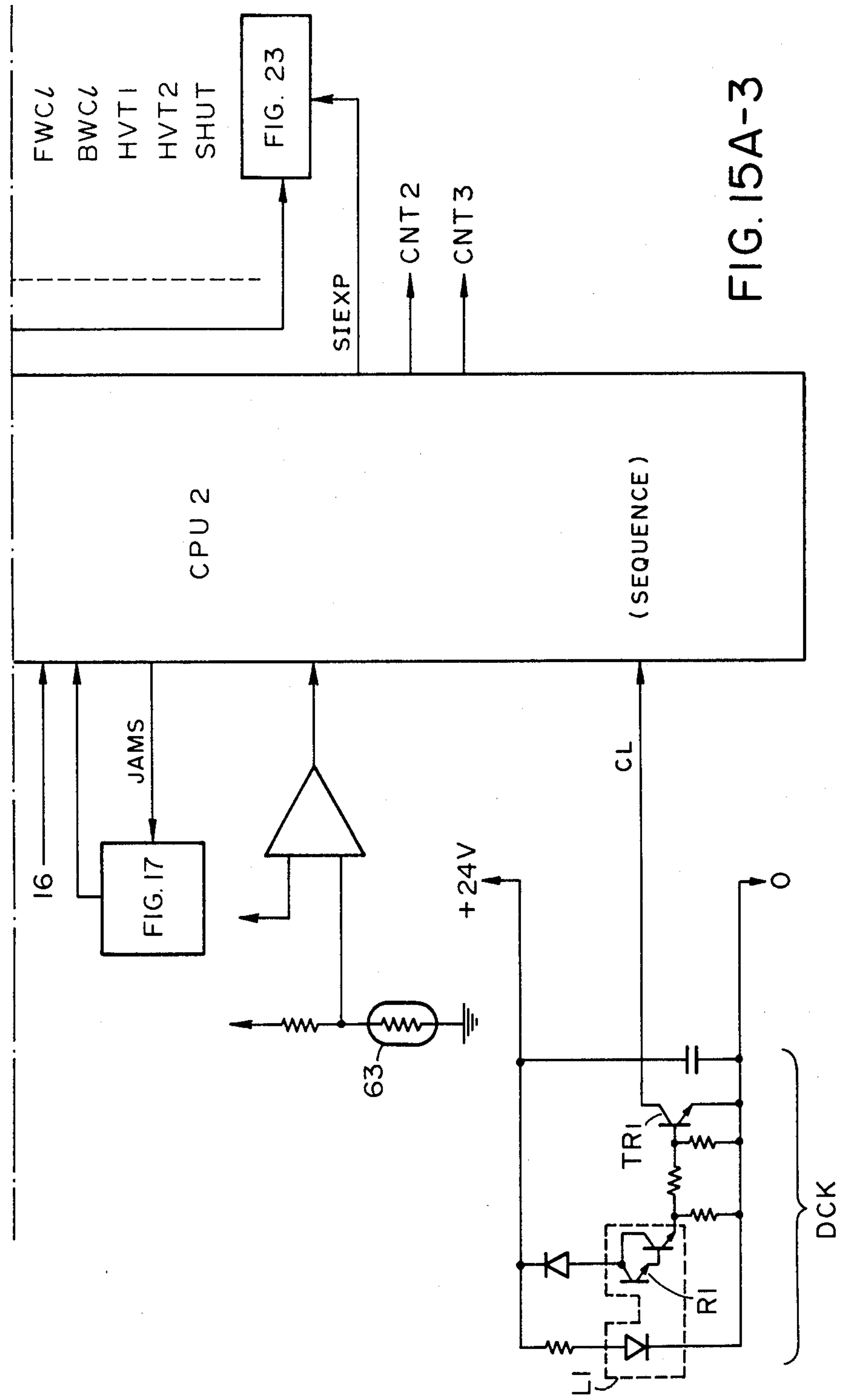

An example of these circuit diagrams is shown in FIG. 15C. Either CPU 1 or CPU 2 may have the voice statement program memory, but in this example, CPU 2 has it. CPUs 1 and 2 have the same function as in FIGS. 15A-1 through 15A-3. 501 is a white noise source, 500 a converter to filter noise from 501 by control signal $\alpha$ regarding the statement from CPU 2 and convert into statement analog signal and the audio amplifier an amplifier to drive the speaker 50 with the conversion signal.

The functions of CPU 1 and CPU 2 can be executed by one microcomputer conmprising one-chip semiconductors inclusive of RAM and ROM, which is generally caled CPU. The above and following sequence control, display alarm and entry control, etc. can be achieved easily with program softwares. (Jam reset, half-open door checking)

Figure 17:
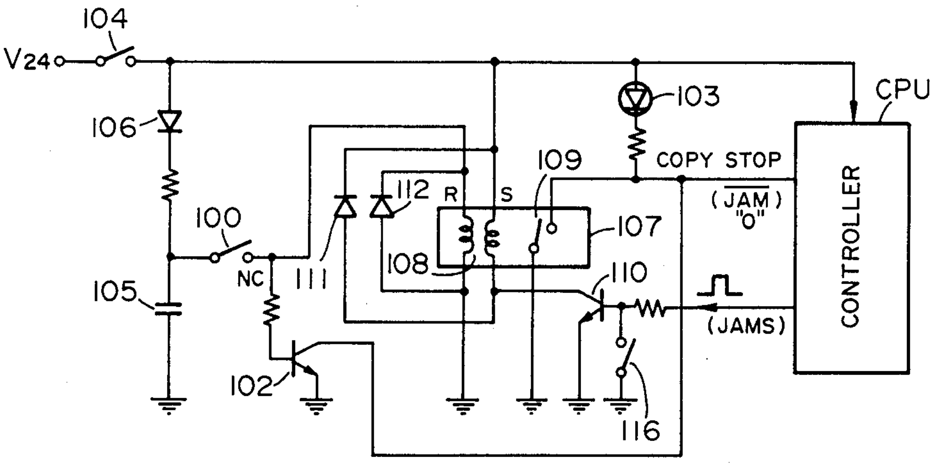
FIG. 17 is a JAM reset door-locking-failure detection circuit diagram.
Figure 18:
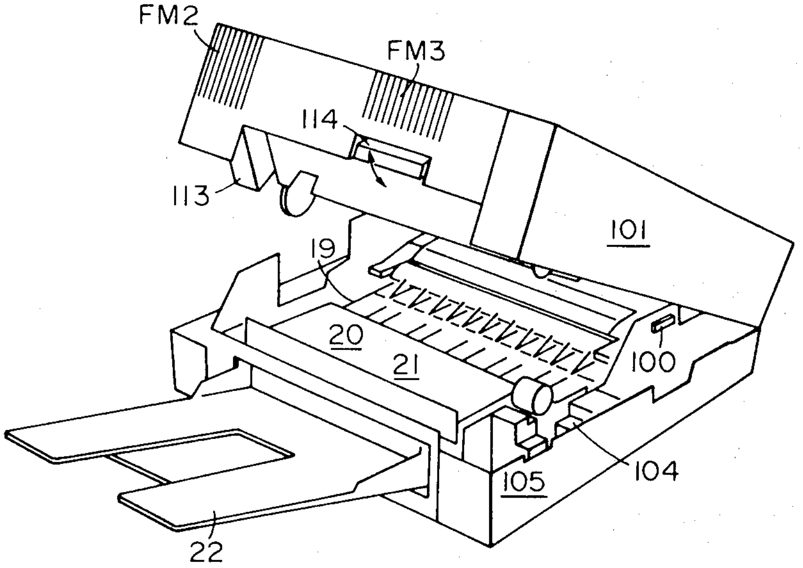
FIG. 18 is a perspective view of the apparatus shown in FIG. 1.

FIG. 17 is a circuit diagram for jam indication, jam reset and half-open door checkup of housing door. FIG. 18 is an oblique view when the housing door 101 is opened.

In FIG. 17, CPU is, as previously mentioned, a control unit to detect sheet jamming and 100 a microswitch provided in the housing door 101 for detection of half-open condition of the housing door, with its normally on indicating the door closed normally.

102 is a transistor to be on when detecting half-open door, 103 LED to indicate half-open door and sheet jam conditions, which corresponds to 49 in FIG. 3, and 104 a door switch to detect closing of the door 101 provided on the body side 105, which will be on when the door is closed. 105 is a condenser for jam resetting, 106 a diode for reverse-current interruption, 107 a latch relay for jam hold, 108 (S) a coil to set the latch relay and turn on the switch 109, 108 (R) a coil to release the latch relay and turn off the switch 109, 110 a transistor to be on by the JAM detection signal JAMS from CPU and 111, 112 are diodes for consumption of induced current at time of coils 108 and 109 OFF.

The operation will now be described in the following. If it is assumed that the housing door 101 is closed, the door switch 104 is on and the transistor 101 is turned on by the jam detection signal JAMS from CPU and sets the set coil 108 (S) with power source V. Thereby the switch 109 is closed, turning LED 103 on, and the jammed condition is indicated by the indicator 49. This condition is maintained even if there is no more signal JAMS under action of the latch relay 107. At the same time, the signal JAM to stop the machine is inputted to CPU. Thereupon, CPU causes, as mentioned hereinafter, sequence processes such as fixing heater OFF, copying interruption (before completion of one process) and drum post-rotation, etc. to be executed.

If the door 101 is opened at the time of occurrence of jamming, the door switch 104 is turned off, LED 103 goes out and power to CPU is cut off. On the other hand, the half-open door 100 is closed. In the meantime, since the condenser 105 has been charged through the diode 106 before the door switch 104 was turned off, by opening the door 101, its charge switches on the reset coil 108 (R) of the latch relay 107 via the switch 100 and opens the switch 109 as illustrated. Thereby LED 103 display, etc. is prevented when the door 101 is closed after release of jam holding and removal of jammed sheet.

In the meantime, since charges at the condenser 105 are held for about scores of minutes, a sufficient function is displayed for relief of jam after cutting power off by means of the door switch 104. Accordingly, in comparison with conventional cases where spring or claw, etc, is employed to hold a jammed condition mechanically and relieve the claw by means of a manual push button after disposal of jamming, jam resetting is now possible under quite a simple construction.

In the apparatus of this embodiment, the drum and the main motor to drive it are provided on the side of the door 101 and the sheet conveying belt 19 and the fixing roll 20, etc are provided on the side of the apparatus proper 105. And these roll and belt are drive-connected to the main motor with the gear 113 (FIG. 18). Accordingly, when the door 101 is closed after elimination of jamming, if the door is not closed completely, the gear 113 will not be engaged and if, in such condition, copying is started in the copying apparatus, the machine parts will be damaged.

To prevent such trouble, the half-open door switch 100 serves for the purpose. That is to say, if the door is not closed completely, the door switch 104 is closed and the half-open door switch 100 is also closed. Consequently the transistor 102 is switched on by the power source V via the diode 106 and connects LED 103 to earth to cause it to be on or to flash. At the same time, a stop signal as at the time of jamming is inputted to CPU to make copy start impossible. If the door is closed completely, the switch 100 opens to stop LED 103 indication and the stop signal, too, is switched off to make copying possible. For the purpose of flashing indication, the transistor 102 may be made an oscillation type.

Figure 19:
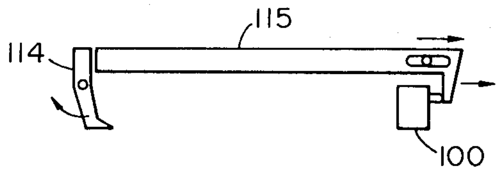
FIG. 19 is a sectional view of the lock lever shown in FIG. 18.

In this embodiment, the half-open door switch 100 is interlocked with the lever 114 to open manually the door 101 locked with the apparatus proper and turned on immediately on opening of the lever and can detect a delicate condition of the door. Its operating condition is shown in FIG. 19. 115 represents the interlocking lever and the switch 100 is turned off by the movement in the direction of arrow by the lever 114.

On the other hand, display can be discriminated by providing LED for display of half-open door condition in distinction from jam display and by causing LED 103 to flash at time of jamming and to light statically at time of half-open door. Further, since the half-open door switch 100 can be regarded as a switch for jam resetting as mentioned previously, the abovementioned half-open door checkup and jam resetting can be carried out by means of one switch, thus making it possible to provide quite a simple control unit.

On the other hand, it is feasible to employ a battery as the condenser 105.

(Jam elimination)

In FIG. 17, the switch 116 is a switch provided on the circuit base plate within the apparatus, which serves to prohibit input of machine stop signal due to jamming to CPU and thereby, even in the case of jamming, cause copy run to continue to the last, that is, effect run as in normal conditions. Accordingly, it is possible to effect copying without sheet feed and check up machine operation without paper loss.

The operation will be described in the following. If the switch 116 is turned on, a signal outputted on detection of JAM detection from CPU is bypassed by 116 and the transistor 110 won't be switched on. Consequently, the latch relay 107 will not be set, not generating the jam stop signal. Accordingly, CPU effects jam checking, but sequence processes such as heater-off, high-tension off and drum post-rotation, etc. are not carried out and copying will continue.

However, since interlock by the half-open door switch holds priority, copy operation is interrupted irrespectively of the switch 116 at the time of detection of half-open door. The degree of safety is elevated thereby. This way of thinking serves for the elevation of the degree of safety even in a machine test run by jam differentiation as mentioned above in cases where malfunction with different objects is cautioned in using the same indicator or the same control circuit is employed or where after detection of malfunction, post-rotation of a similar degree as mentioned previously after detection of malfunction is effected.

(Process bright/dim sequences)

Figure 21A:
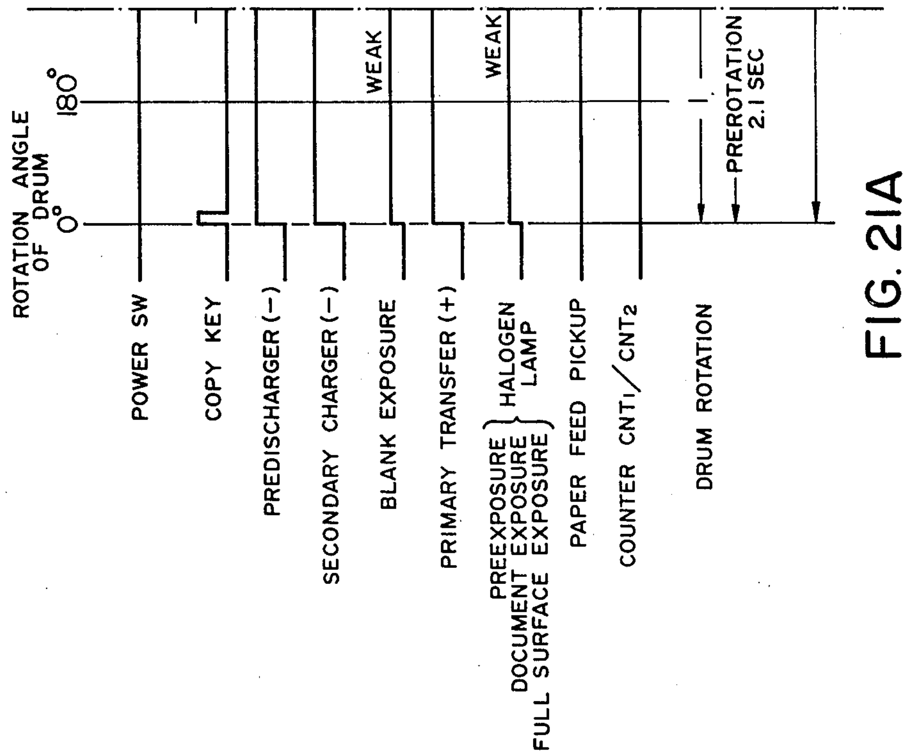
FIGS. 21A and 21B, and 22A through 22D, when combined as shown in FIGS. 21 and 22, respectively, are detailed operation time charts.
Figure 21:
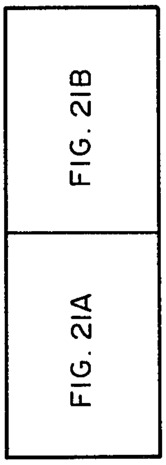
Figure 21B:
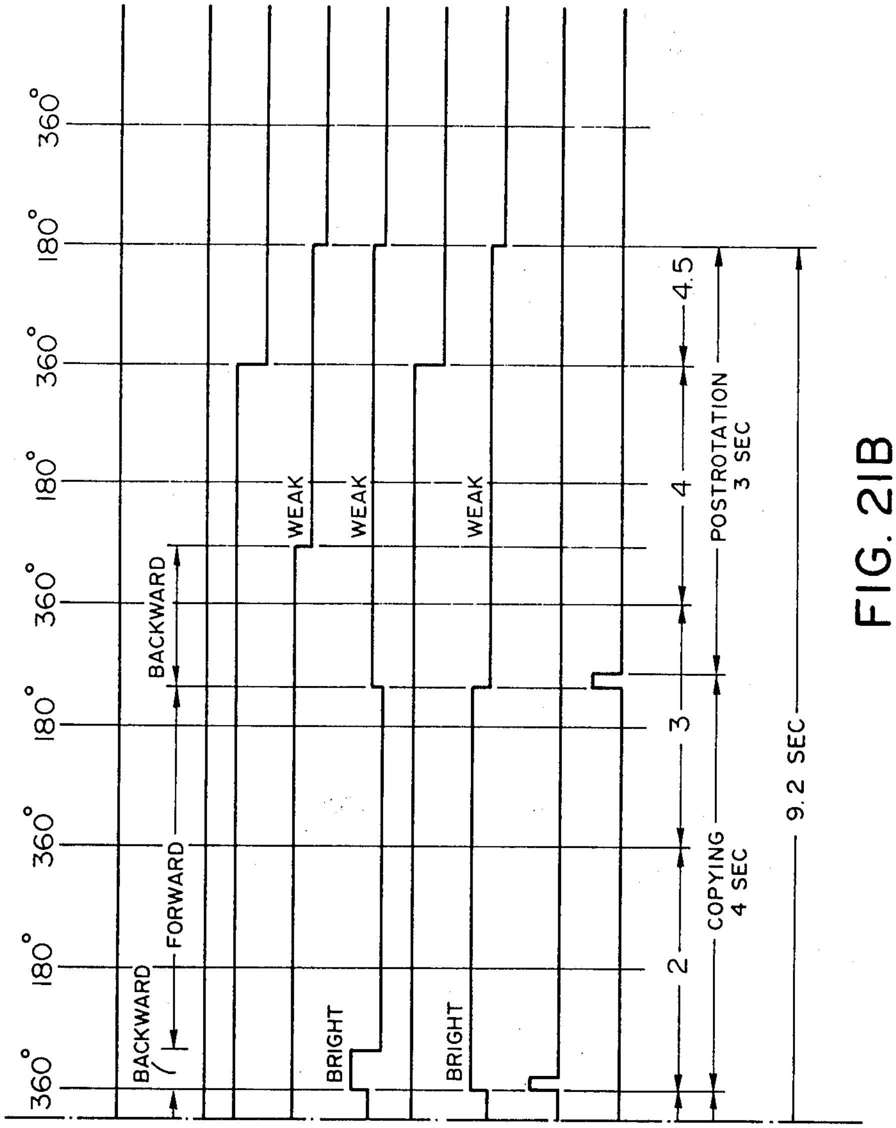
Figure 22A:
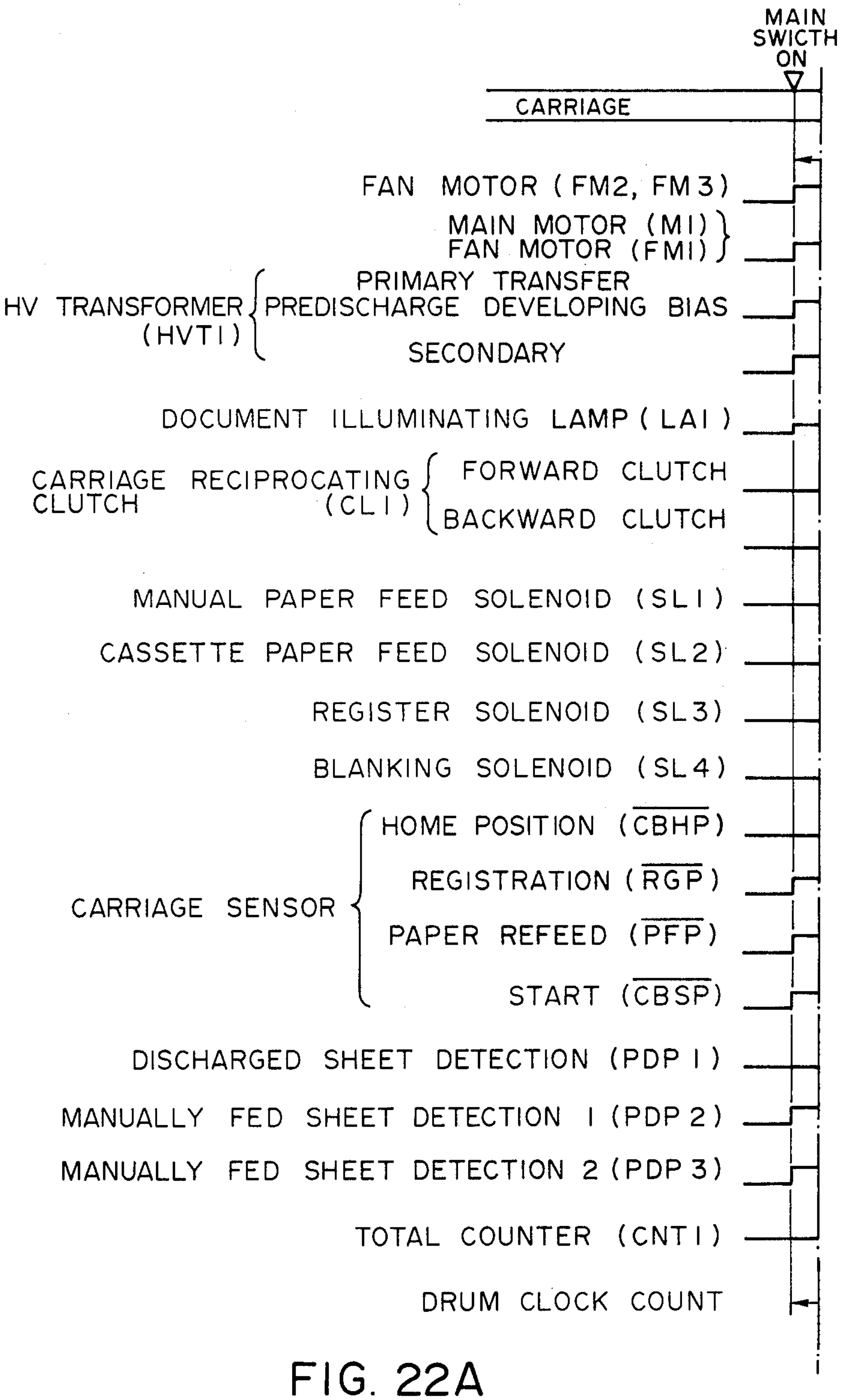
Figure 22B:
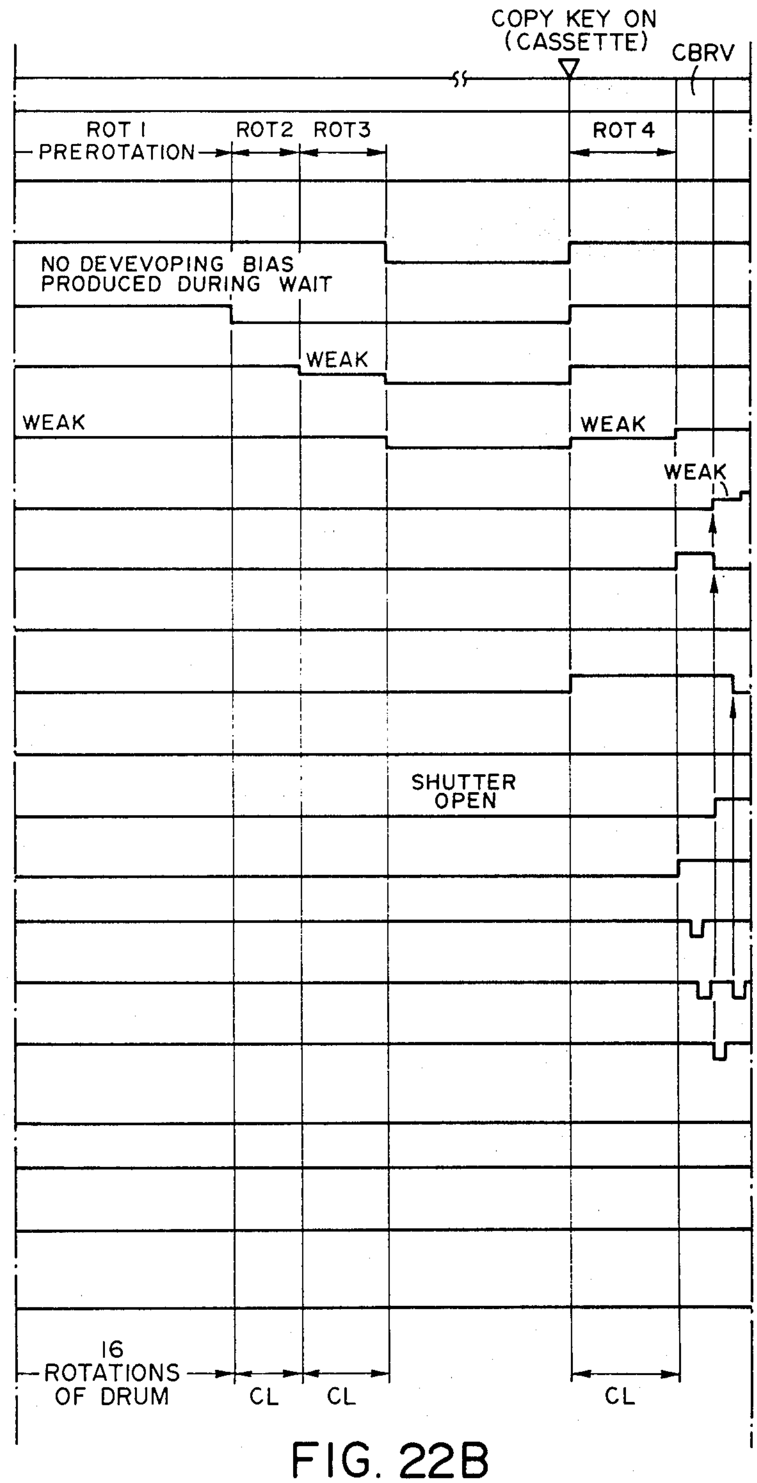
Figure 22C:
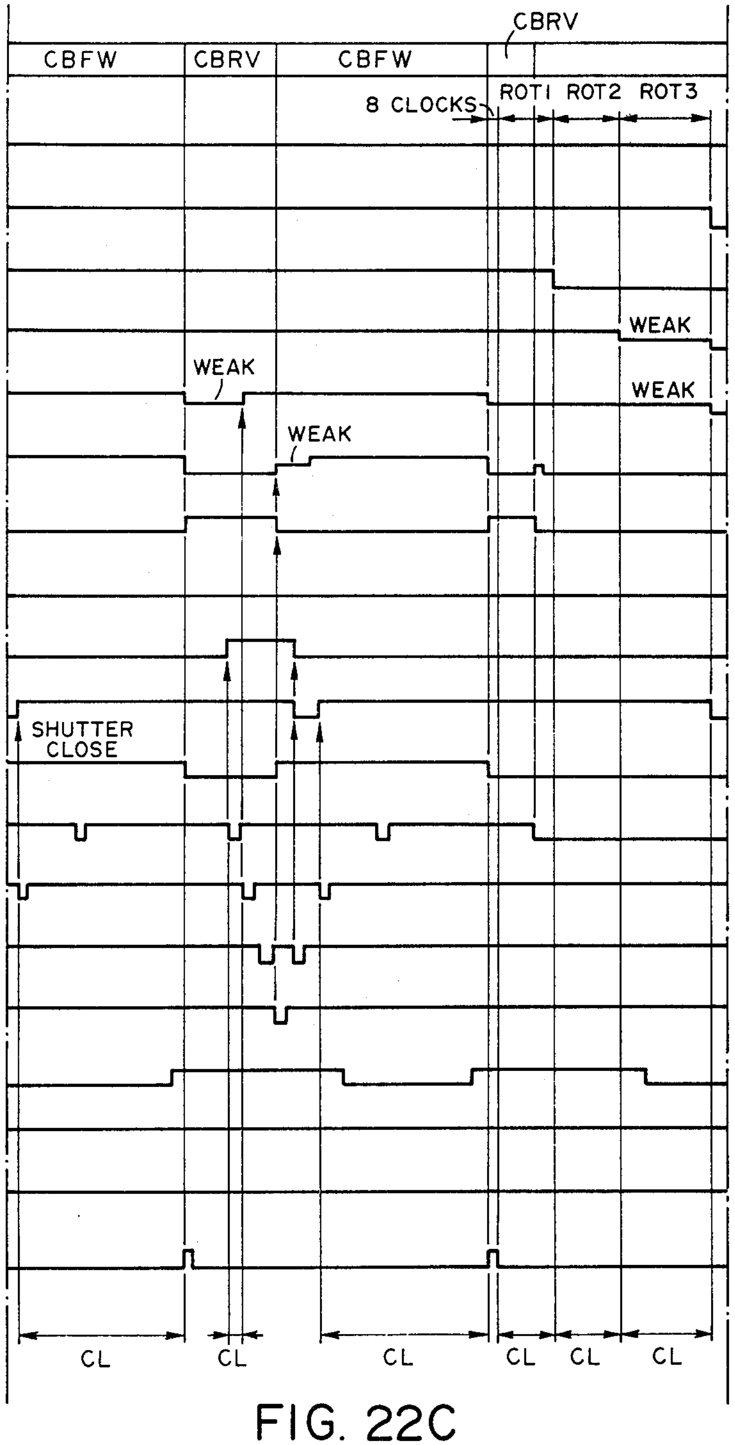
Figure 22D:
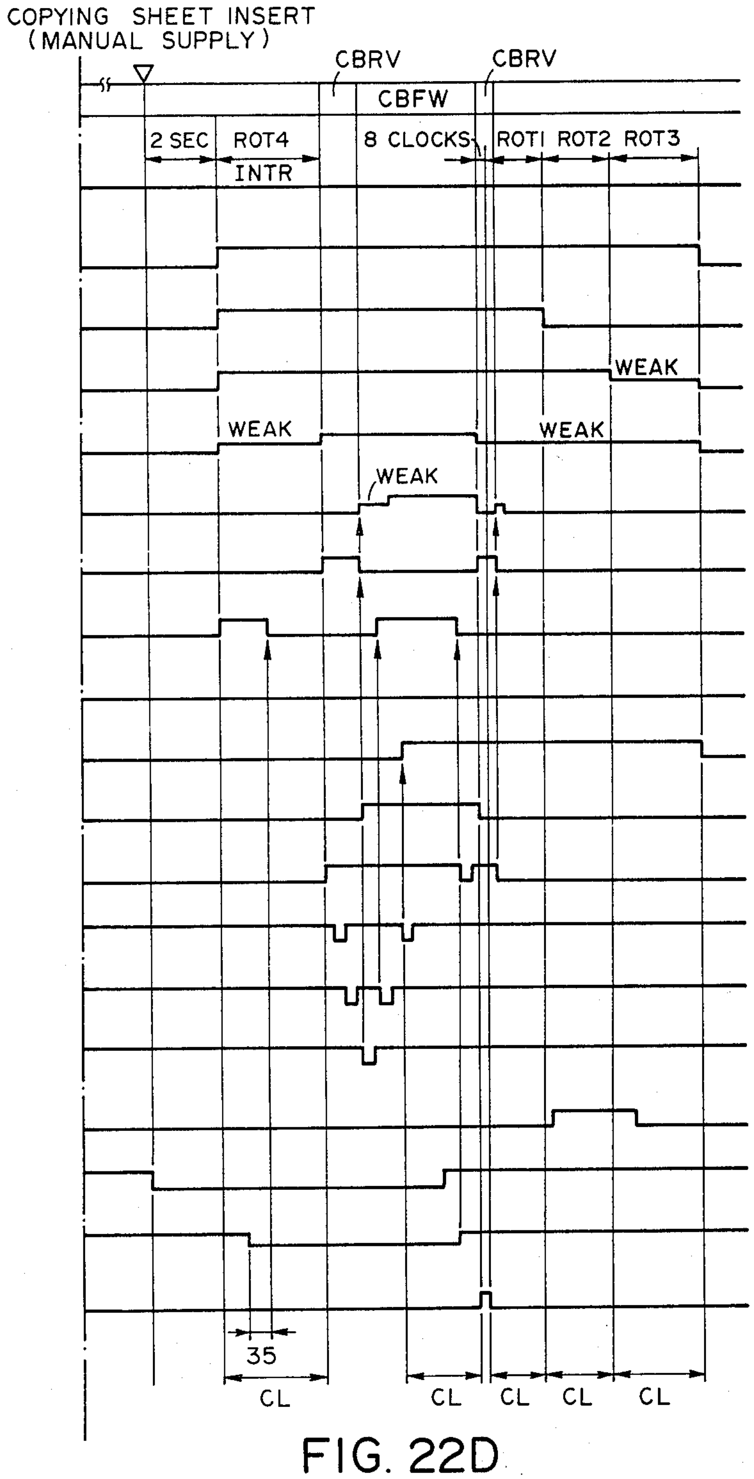

FIGS. 21A and 21B are operation time charts for one-sheet copying (size A3) and FIGS. 22A through 22D detailed time charts in the case of A3 two-sheet copying and A4 manual supply copying.

The halogen lamp is lit dimly during the first and second prerotation and post-rotation (LA 1). In this embodiment, lamp voltage is changed to change the quantity of light for setting tone gradient and dim lighting of lamp mentioned above means lighting condition in quantity of light set equal to or lower than the minimum quantity of light set as above. During performance of the process, lamp is lit brightly, that is, according to preset brightness.

Figure 20A:
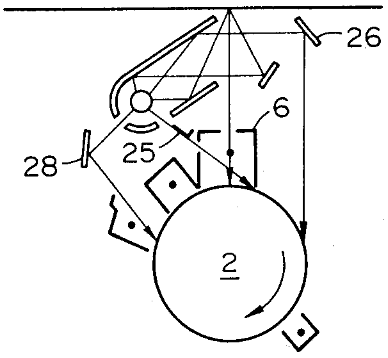
FIGS. 20A, 20B and 20C are partial sectional views of the apparatus shown in FIG. 1, showing lamp light paths.
Figure 20B:
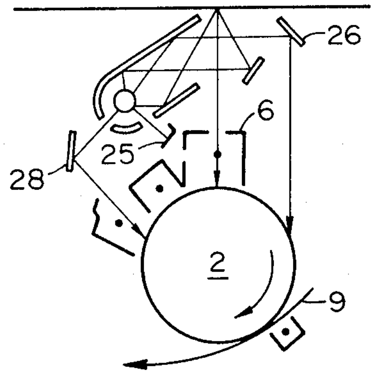
Figure 20C:
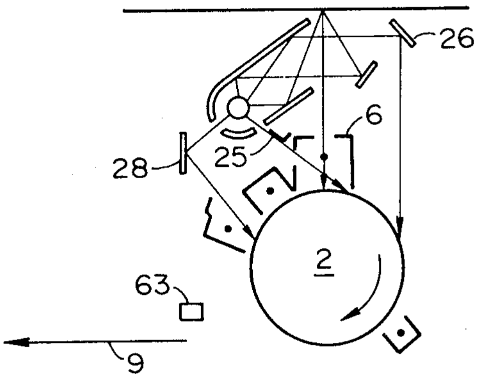

For blanking exposure, light from the halogen lamp is radiated over the drum by opening the shutter 25 during non-image exposure (FIGS. 20A and 20C). Accordingly, during pre- and post-rotation, dim light mode similar to the above-mentioned lamp LA 1 is applied. From the start of copy cycle to the time when the platen reaches the exposure start position, the drum is radiated with dim blanking light. Accordingly, until directly before image exposure, the drum surface is exposed uniformly and potential equalized. On the other hand, at the start of cycle the lamp LA 1 is lit bright to make preradiation light bright via the changer 24. However, the surface preceding the drum surface over which such light is radiated (surface from the charger 24 to 6) is processed with dim light and therefore latent image mottle may be produced on image exposure at the boundary between bright and dim zones. Accordingly, the dim light process zone is excluded from the latent image forming surface. Further the surface is subjected to blanking exposure for bright light processing and therefore mottles can be avoided. In addition, the time (the initial backward time to have the platen reach the switch 30) is caused to correspond beyond such zone and therefore there is no waste of time.

For preexposure and overall exposure, lighting synchronous with the halogen lamp and a bright-dim sequence are carried out. The preexposure has the function of eliminating a residual image after transfer.

Further, owing to bright-dim control of the lamp, temperature rise of the platen surface and the surrounding members is prevented and lamp life is protected. In particular, since the fiber array 27 is employed in the optical system for image exposure, the apparatus is compact, preventing temperature rise of the surroundings liable to be caused by the halogen lamp.

The secondary charger is operated at low voltage in the second mode of postrotation (ROT 3). (−) corona component is thereby weakened and potential equalization and approach to zero potential on the drum surface are possible at the time of drum stop at the end of post-rotation.

On the other hand, as in FIGS. 21A and 21B, after the primary charger OFF, the secondary charger and the lamp are operated weakly and therefore it is possible to eliminate residual charges in the portion from the primary charger 5 or the transfer charger 90 to the secondary charger or light radiation surface downstream in the revolving direction of the drum 2. Consequently, at the time of drum stop at 180°, the entire drum surface can be discharged evenly for uniform approach to zero.

The timing of switching of the blanking shutter and the timing of voltage switchover of the secondary charger are determined by counting a specified number of the aforesaid drum clock pulses. The clock counting is shown as CL in the "clock count" column of FIGS. 22A–22D (time chart). The shutter 25 shuts off the blanking light on solenoid-on signal (SHUT) from CPU.

FIGS. 20A, 20B and 20C show the sequence operation of platen light via the secondary corona charger 6, overall exposure via the mirror 26, preexposure via the mirror 28 and blanking light via the shutter 25, in which (a) indicates the first revolution of the drum after copy key ON, (b) the second revolution of the drum, platen exposure, and (c) cycle end, that is, the fifth revolution of the drum and platen stop. (Lamp regulator)

Figure 23:
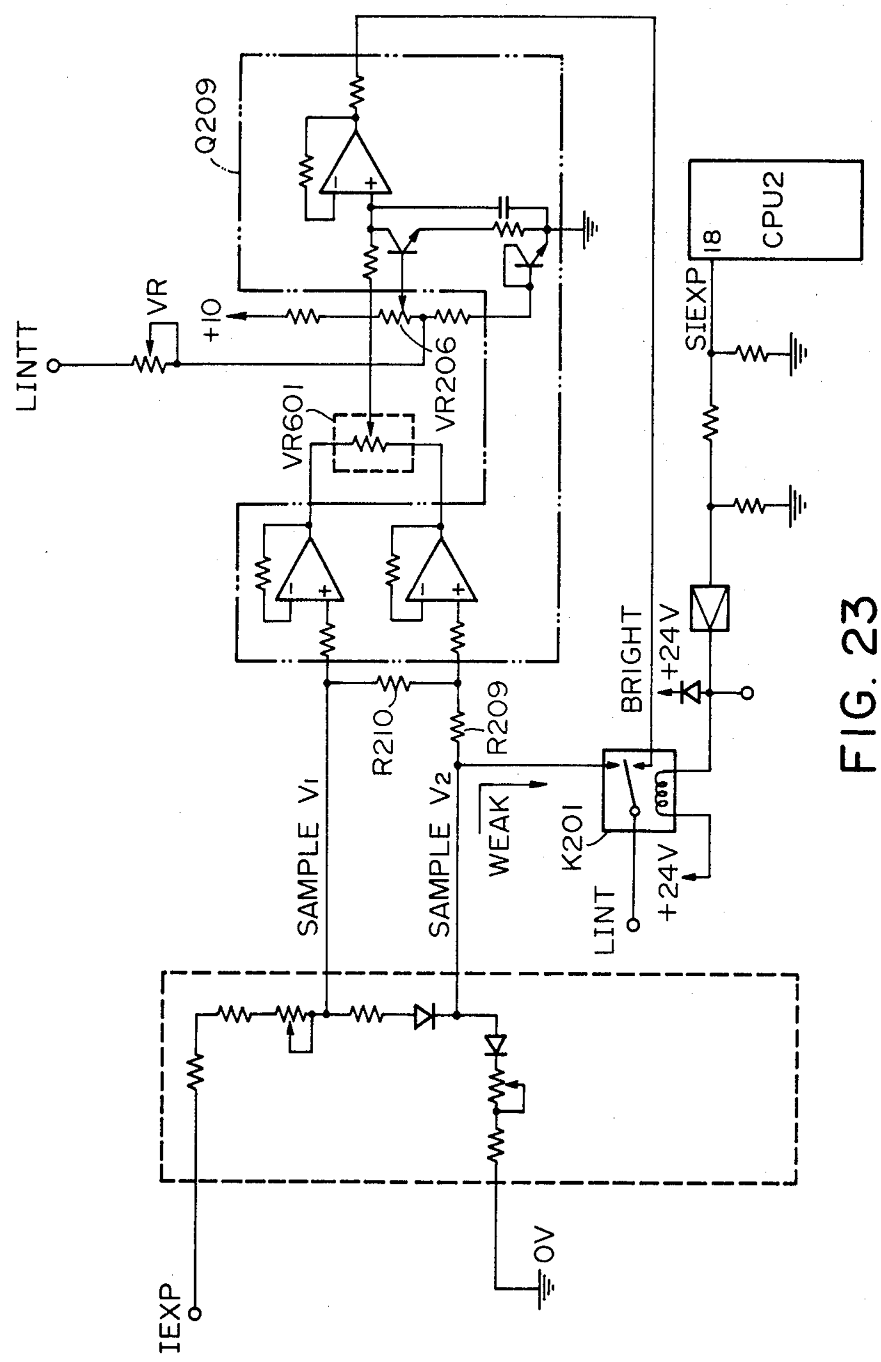
FIG. 23 is a dimmer set circuit diagram.

FIG. 23 shows a circuit for switchover of lamp light, in which IEXP represents lamp-on signal from CPU, V1 output voltage for bright exposure as set by a lamp regulator (not shown), VR601 a resistor for light quantity control by the gradation lever 44 of the control unit, Q209 a circuit to set, as desired, the light quantity adjusting range with VR601 and serve for shift change of center light quantity while maintaining the range, V2 output voltage for dim exposure, LINT output of dimmer signal and lighting signal to the lamp regulator (not shown) (whereby lamp is lit and operated at a desired quantity of light), K201 a relay for bright-dim switchover, SIEXP a light quantity changeover signal from CPU and LINTT a voltage signal obtainable from a light quantity compensation timer (not shown) and varying with the duration of copy pause. The longer the pause is, the more the quantity of light at the initial period of switchover to bright light is increased.

The operation will now be described. If IEXP is outputted from CPU synchronously with the main motor, specified voltage V1 is outputted from the regulator for impression of rated voltage upon the lamp at time of max. light quantity. Within the dimer limits to be determined by R209 and R210, dimmer voltage is set by the dimmer volume VR601 and Q209 outputs a strong signal voltage. This voltage can be shift-adjusted by means of the resistor VR206.

On the other hand, if machine operation is resumed in a copy pause condition, initially the sensitivity of the sensitive material is recovered and high and irregularities in density are produced in latent images between the first sheet and the fourth or fifth sheet. Further, such irregularities are more conspicuous when the time of copy pause was longer, but do not appear when there was little pause. Accordingly, in this embodiment, the quantity of light of the lamp is controlled according to the time of pause so as to be able to copy the first and subsequent sheets at the same density irrespectively of the length of time of pause.

That is to say, a condenser to discharge during pause and charge during copying is provided and light quantity adjustment is made with output voltage LINTT corresponding to condenser charging voltage. That is, the longer the time of pause, the lower the voltage LINTT and at the time of resumption of copying, Q209 outputs set voltage shifted down somewhat and, with performance of copying, LINTT and Q209 set voltage rise and increase the quantity of light, which returns to a fixed quantity of light on completion of condenser charge. On the other hand, in case the pause time is short, the voltage LINTT is not so low and therefore a change in light quantity is small.

The condenser is charged simultaneously with prerotation ROT 4 and discharged when postrotation begins. On the other hand, at the time of premultirotation ROT 1, no charging takes place. This is because the premultirotation ROT 1 is a rotation not contributing to latent image formation, for which reason no light quantity adjustment is made. During the premultirotation ROT 1, the photosensitive material is exposed weakly for recovery of sensitivity to some extent and subsequently, with prerotation ROT 4, light quantity adjustment is made, whereby a stable latent image is formed. In this embodiment, the condenser discharge time is quite longer than the charge time.

The level H (strong exposure) of the light quantity switchover signal SIEXP from CPU to be outputted at the specified timing switches the relay K201 on and Q209 strong signal voltage is outputted as a dimmer output LINT. During prerotation and postrotation, SIEXP is at the level L and therefore, as mentioned above, a weak signal voltage V2 is outputted as a dimmer output LINT.

Bright-dim light timing is shown in FIGS. 22A–22D. For lighting with bright light during CBFW, first dim light during ROT 1–ROT 3 and second dim light between the abovementioned bright light and first dim light in other cases, SIEXP is caused to output synchronously with CBFW and sample V2 output and R210–R209 connection point output can be given by switching. Thereby more appropriate potential equalization effect is obtained and the life of the halogen lamp can be extended.

On the other hand, since the carriage is stopped at time of dim light, shortening of life due to shock is small. Further, as in FIGS. 22A–22D, at the time of carriage stop, the same current as at the beginning of forward feed is applied to the forward clutch for a fixed short time to apply reverse power and therefore the carriage can be stopped correctly and soft at the specified middle position without any mechanical stopper. The forward clutch transmits power of the main motor to the carriage, while the backward clutch increases the backwad speed via gear. In the meantime, by setting the timing of switchover of lamp to bright light a little later than the timing of switchover of carriage from backward to forward and the timing of switchover to dim light a little earlier than the timing of switchover from forward to backward, it is possible to cause shock at time of movement reversal to correspond to the time of dim lighting.

On the other hand, concerning the lamp regulator, Japanese Patent Laid-Open Publication No. 90180/1976 of the Applicant is known, while the circuit 209 is described in detail in Japanese Patent Application No. 8273/1978.

(Drum heater control)

For the purpose of preventing the photosensitive drum from being deteriorated due to temperature, humidity and other environments and affecting copy image quality adversely, the drum heater is mounted in the drum shaft.

Figure 24:
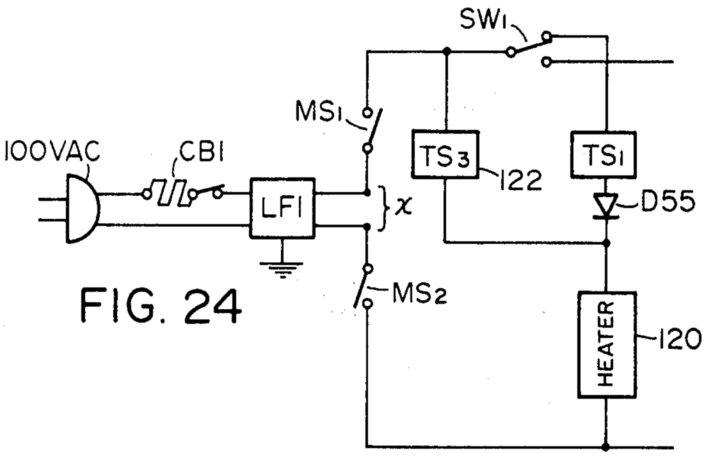
FIG. 24 is a drum heater circuit diagram.

FIG. 24 is a drum heater control circuit, in which 120 is a heater provided as an extension in the longitudinal direction of the shaft and TS1 and TS3 are thermo-switches provided near the reverse side bottom plate in the interior of the apparatus proper for detection of machine atmosphere, whose working temperatures are different from each other. SW 1 is the main switch of the control unit, MS 1 and MS 2 are the door switches (104) provided at locations illustrated for bilateral power cut-off, CB 1 a breaker, LF 1 a low pass filter and DS 5 a diode to feed half-wave to the heater 120.

In this embodiment, under three conditions of TS 1, TS 3 and SW 1, 5 modes of heater power supply are provided to effect drum heating at high accuracy. That is, overheating of a drum to over 45° C., for instance, causes fusion or solidification of toner on the drum and therefore, to prevent such danger, dehumidification and proper temperature are ensured effectively.

FIG. 24 shows main switch (SF 1) and door switches (MS 1, MS 2) being all in OFF state. The operating conditions are as shown in the following table.

TS 1 is turned on (closed) below 32.5° C. and off (opened) at above 39.5° C.

TS 3 is turned on (closed) below 16° C. and off (opened) at above 23° C.

The drum heater H1 has a rating of 15 W (at time of ON) and consumes 7.5 W (at time of half-wave rectification).

copy key and main switch (total counter independent of sizes), total counter of copies of sizes B4 and A3 and total counter relative to sizes A4 and B5, respectively.

In cases where a copy counter is connected, +24 V is supplied to the anode of LED 203 via the coil of the copy counter and LED 203 is lit and inputs 0 to Q204, thus making copying possible.

In cases where the copy counter is disconnected or removed, the anode potential of LED 203 becomes zero. And Q205-1 becomes 0, Q204-13 to 1 and Q203-4 to 0, making copying impossible. On the other hand, however, if a counter drive signal is given during copying, 0 is inputted to Q203-4 and copying is possible.

In cases where the copy counter is disconnected or removed, the anode potential of LED 203 becomes 0 V, resulting in Q205-1 to 0, Q204-13 to 1 and Q203-4 to 0, making copying impossible. However, if a counter drive signal is given during copying, 0 is inputted to Q203-4 and copying is possible. Q204 inputs WAIT signal, enabling the same sequence stop mode as mentioned above. The same control is possible in the case of the counter OFF, too.

The said counter applies +1 on a small copy signal SCNTD and a large signal LCNTD. These signals are outputted with CPU detecting and discriminating the sizes of casettes used. On the other hand, the output timing corresponds to the time of move of the platen to the reversal point. In addition, such point turns the memory counter within CPU for display 45 to −1.

| | Temperature | | | | |
|---|---|---|---|---|---|
| | Below 16° C. | 16° C.–23° C. | 23° C.–32.5° C. | 32.5° C.–39.5° C. | Above 39.5° C. |
| TS1 | ON | ON | ON | ON or OFF | OFF |
| TS3 | ON | ON or OFF | OFF | OFF | OFF |
| Drum Heater (H1) SW1 OFF | ON (Full wave) | ON or Half-wave rectification | Half-wave rectification | Half-wave rectification or OFF | OFF |
| SW1 ON | ON | ON or OFF | OFF | OFF | OFF |

(Fan motor)

In FIG. 1, besides the exhaust fan and the suction fan, an exhaust blower is provided near the fixing means for cooling of the fixing means, carriage and document lamp, etc.

Figure 25:
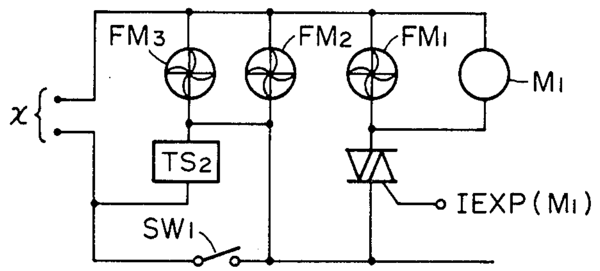
FIG. 25 is a fan motor circuit diagram.

FIG. 25 shows a circuit for control of blower and exhaust fan, in which FM 3 and FM 2 are blower motor and exhaust motor, respectively, TS 2 is a thermo-switch provided near the fixing means to detect its temperature and SW 1 the main switch.

Each is provided with a fan motor, with the suction fan motor FM 1 being synchronous with operation of the main motor.

The exhaust fan FM 2 and the blower motor FM 3 are provided to prevent temperature rise and operate at the time of the power switch ON and the thermo-switch TS 2 ON when the power switch is OFF.

In the meantime, TS 2 ON takes place at over 55° C. and OFF at below 45° C.

The suction fan FM 1 is provided in the machine on the side where the developing means is provided. Accordingly, if developing toner is replenished with the power switch SW 1 ON, the toner may fly up and contaminate the machine interior. Accordingly, due attention should be paid to replenishment of toner. In this embodiment, the suction fan FM 1 is synchronous with the main motor. This fan is stopped at the time of replenishment of toner and therefore the abovementioned disadvantage can be prevented.

(Total counter)

Figure 26:
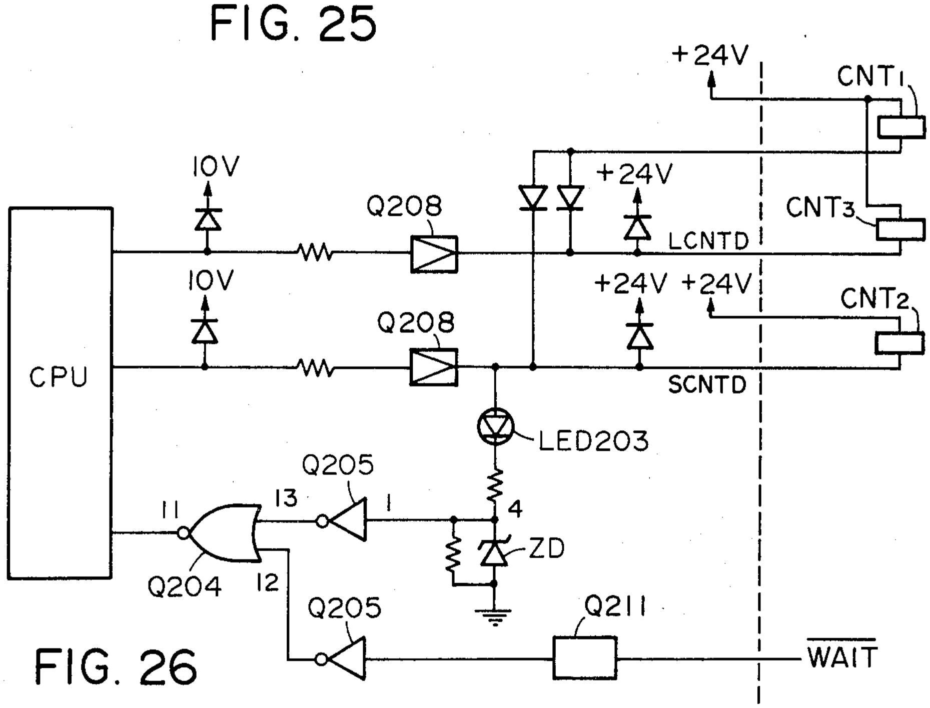
FIG. 26 is a copy counter circuit diagram.

The mechanical copy counter will be described with reference to FIG. 26. In this figure, CNT 1, CNT 2 and CNT 3 are the known mechanical counter to count and memorize a total number of copies irrespectively of In this embodiment, jam detection is effected in the following way, that is, in cases where the paper detector 13 provided at the outlet of the sheet path does not detect a sheet at a specified time of process, it is determined locally to be a jam before the detector, whereas in cases where a sheet top actuates the detector and the timer and, within the timer time, the sheet does not come off the detector and the sheet is detected even after the end of timer time, it is determined to be a jam near the detector (in the vicinity of the fixing means), and in each of the above cases the signal JAMS is outputted. Further by discriminating them as JAMS 1 and JAMS 2, they may be used for the abovementioned rotation control and display control.

What we claim is:

1. Image forming apparatus comprising a rotatable medium, means for forming an image on said rotatable medium, means to transfer the image formed by said image forming means onto a transfer material, a light source to radiate light over said rotatable medium, means for radiating light from said light source over different points of said rotatable medium, first control means for sequence control of said rotatable medium, said image forming means and said transfer means, and second control means responsive to the sequence control of said first control means for sequence control of on and off of said light source and its quantity of light.

2. Apparatus according to claim 1, wherein said light source comprises a halogen lamp.

3. Apparatus according to claim 1, wherein said radiation means includes a mirror and a shutter for control of a path of light from said light source.

4. Image forming apparatus comprising a rotatable medium, means for forming an image on said rotatable medium, means for transferring an image formed by said image forming means onto a transfer member, means for radiating light over said rotatable medium at a different point from the image forming station, means for controlling the light quantity from said radiating means to said rotatable medium so that said quantity of light is increased from a low level of intensity to a higher level before commencement of image formation, and means for rotating said rotatable medium and for starting the image formation in such a manner that the image formation is performed on said rotatable medium so as to avoid the area of said rotatable medium which was subjected to said low level of light by said control means.

5. Apparatus according to claim 4, where said image forming means includes a document scanning reciprocating member, and said control means controls said light quantity so that said low level of light is radiated before scanning movement and said higher intensity light is radiated upon movement of said reciprocating member for scanning.

6. Apparatus according to claim 4, further comprising means for radiating light over different portions of said rotatable medium from a single exposure lamp.

7. Image forming apparatus comprising a rotatable medium, means for forming an image on said rotatable medium, means for transferring the image formed by said image forming means onto a transfer material, means for radiating light over said rotatable medium at an image forming station or at a different point from the image forming station, means for rotating said rotatable medium for a predetermined time after termination of image formation or before image formation, for pre or post treatment of said rotatable medium, and means for controlling the exposing quantity of light to said rotatable medium, wherein said controlled quantity of light in said predetermined time is less than that of the light at the time of image formation.

8. Image forming apparatus comprising a rotatable medium, means for forming an image on said rotatable medium, said image forming means including a light source for effecting an image exposure, means for transferring the image formed by said image forming means onto a transfer material, means for radiating light over said rotatable medium at an image forming station or at a point spaced from the image forming station, means for rotating said rotatable medium for a predetermined time before image formation or after termination thereof for pre or post treatment of said rotatable medium, and means for controlling said light source such that the electrical power of the light source in said predetermined time is less than that of the light source during the image exposure, wherein the quantity of light radiated over said rotatable medium from said radiating means is less than that of the light from said light source during the image exposure and changes from the lesser quantity to an image exposing quantity before starting the image exposure.

9. Apparatus according to claim 8, wherein said light radiating means includes a mirror and a shutter for control of a path of light from said light source.

10. Apparatus according to claim 9, wherein said control means controls the light quantity from said light source in the time of return movement of said reciprocating member to be less than that at the time of the scanning movement.

11. Image forming apparatus comprising means for forming a copy image on a medium, said image forming means including a light source for effecting a document exposure, input means for applying a required copy density signal, means for presetting the electrical power supplied to said light source in accordance with said input means to determine the copy density, and means for controlling the electrical power supplied to said light source to be low power which is settable by said presetting means, or to be a power less than said low power in the preliminary time of copy operation before the exposing or after termination thereof, and to be changed from said lower power to the preset power set by said input means at a predetermined timing before commencement of exposure.

12. Apparatus according to claim 11, wherein said image forming means includes a document scanning reciprocating member, and said control means controls the light source such that said preset light quantity exists before the forward movement of said reciprocating member or after the termination thereof, and such that the light quantity changes from the preset quantity before the start of the forward movement of the reciprocable member.

13. Apparatus according to any one of claims 4, 5, 6, 7, 8 or 11 wherein said control means controls the light quantity to said rotatable medium at the time between first and second image formations to be less than that at the time of image formation.

14. Image forming apparatus comprising means for forming an image on a medium, said image forming means including a light source for effecting a document exposure and a reciprocable member for scanning the document, means for detecting a stop point of the movement of said reciprocable member, first control means for stopping the backward movement of said reciprocable member in response to detection of said stop point by said detecting means and for starting the forward movement of said reciprocable member from said stop point for scanning the document, and second control means for controlling the light source such that the light quantity from said light source is a first quantity during the preliminary time of image formation before the forward movement or after the termination thereof and changes from the first quantity to a second quantity before starting of the forward movement of the reciprocable member from said stop point.

15. Apparatus according to claim 14, wherein said second control means controls the light quantity from said light source in the time of the return movement of said reciprocable member to be less than that at the time of scanning movement.

16. Image scanning apparatus comprising a light source for effecting the exposure of a document; a reciprocable member for scanning the document, a first control means for stopping the backward movement of said reciprocable member a predetermined point and for starting the forward movement of said reciprocable member from said stopping point for scanning the document; and a second control means for controlling the electrical power supplied to said light source such that the light source is supplied with low power when the light source is not used for exposing a document, and that the power is changed from said lower power to the power for image scanning at a predetermined timing before commencement of exposure.

17. Apparatus according to any one of claims 8, 11, 14 or 16, wherein said light source comprises a halogen lamp.

18. Apparatus according to any one of claims 11, 14 or 16, wherein said medium upon which said image is formed comprises a rotatable medium, and wherein said apparatus further comprises means for rotating said rotatable medium for a predetermined period of time after termination of image formation or before image formation, for pre or post treatment of said rotatable medium, wherein said controlled power of the light source during said predetermined period of time is less than that of the light source at the time of image formation.

19. Apparatus according to any one of claims 1, 2, 3, 14, 17 or 9, wherein said second control means controls the light quantity to said medium at the time between first and second image formations to be less than that at the time of image formation.

* * * * *

UNITED STATES PATENT AND TRADEMARK OFFICE

CERTIFICATE OF CORRECTION

PATENT NO. : 4,477,179

DATED : October 16, 1984

INVENTOR(S) : TSUNEKI INUZUKI, ET AL.

It is certified that error appears in the above-identified patent and that said Letters Patent is hereby corrected as shown below:

COLUMN 5

Line 1, "exposured" should read --exposed--.

Lines 4 and 31, "cellfock" should read --selfoc--.

Line 38, "an" (first occurrence) should read --a--.

COLUMN 6

Line 17, delete "the" (second occurrence).

Line 63, after "fixing temperature" insert --is reached--.

COLUMN 8

Line 43, change "the other time" to read --times other--.

Line 52, "substantial" should read --substantially--.

Line 53, after "and" insert --the--.

COLUMN 9

Line 9, "result" should read --detract--.

COLUMN 10

Line 65, "cellfock" should read --selfoc--.

COLUMN 11

Line 1, "post" should read --cost--.

Line 15, cellfock" should read --selfoc--.

UNITED STATES PATENT AND TRADEMARK OFFICE

CERTIFICATE OF CORRECTION

PATENT NO. : 4,477,179

DATED : October 16, 1984

INVENTOR(S) : TSUNEKI INUZUKI, ET AL.

It is certified that error appears in the above-identified patent and that said Letters Patent is hereby corrected as shown below:

COLUMN 11

Lines 27-28, delete "and a clutch for forwardly moving the platen 1,".

COLUMN 12

Line 23, "plate" should read --platen--.

COLUMN 14

Line 9, "open" should read --opened--.

Line 28, "not" should read --now--.

COLUMN 17

Line 27, "present" should read --preset--.

Line 40, "if" should read --is--.

Line 61, "where after" should read --whereafter--.

COLUMN 19

Line 34, delete "to be".

COLUMN 20

Line 61, "other" should read --another--.

COLUMN 23

Line 14, change "lam" to read --lamp--.

UNITED STATES PATENT AND TRADEMARK OFFICE

CERTIFICATE OF CORRECTION

PATENT NO. : 4,477,179 Page 3 of 4

DATED : October 16, 1984

INVENTOR(S) : TSUEKI INUZUKI, ET AL.

It is certified that error appears in the above-identified patent and that said Letters Patent is hereby corrected as shown below:

COLUMN 23

Line 28, "at" should read --is at a--.

Line 43, after "and" insert --from becoming--.

Line 49, after "allow" insrt --the--.

Line 67, "It is shown in Fig. 13B. If" should read --If, as shown in Fig. 13B,--.

COLUMN 24

Line 11, "microcomputer each" should read --microcomputers-

Line 67, "if" should read --is--.

COLUMN 25

Line 3, delete "up".

COLUMN 26

Line 15, delete "normally".

Line 16, "on" should read --open condition--.

COLUMN 27

Line 56, after "set," insert --and will--.

COLUMN 28

Line 9, after "22D" insert --are--.

UNITED STATES PATENT AND TRADEMARK OFFICE

CERTIFICATE OF CORRECTION

PATENT NO. : 4,477,179

DATED : October 16, 1985

INVENTOR(S) : TSUNEKI INUZUKI, ET AL.

It is certified that error appears in the above-identified patent and that said Letters Patent is hereby corrected as shown below:

COLUMN 29

Line 41, "dimer" should read --dimmer--.

COLUMN 30

Line 40, "soft" should read --softly--.

COLUMN 31

Line 67, "counter" should read --counters--.

CLAIM 16

Line 5, after "member" insert --at--.

Signed and Sealed this

*Tenth* Day of *December 1985*

[SEAL]

*Attest:*

DONALD J. QUIGG

*Attesting Officer* *Commissioner of Patents and Trademarks*